US011418746B2

(12) United States Patent
Kitano

(10) Patent No.: US 11,418,746 B2
(45) Date of Patent: Aug. 16, 2022

(54) SOLID-STATE IMAGE SENSOR, IMAGING DEVICE, AND METHOD OF CONTROLLING SOLID-STATE IMAGE SENSOR

(71) Applicant: Sony Semiconductor Solutions Corporation, Kanagawa (JP)

(72) Inventor: Shin Kitano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/054,843

(22) PCT Filed: Mar. 14, 2019

(86) PCT No.: PCT/JP2019/010452
§ 371 (c)(1),
(2) Date: Nov. 12, 2020

(87) PCT Pub. No.: WO2019/239661
PCT Pub. Date: Dec. 19, 2019

(65) Prior Publication Data
US 2021/0218924 A1    Jul. 15, 2021

(30) Foreign Application Priority Data
Jun. 14, 2018  (JP) .............................. JP2018-113336

(51) Int. Cl.
*H04N 5/3745* (2011.01)
*H04N 5/369* (2011.01)
(Continued)

(52) U.S. Cl.
CPC ......... *H04N 5/37452* (2013.01); *H04N 5/353* (2013.01); *H04N 5/361* (2013.01);
(Continued)

(58) Field of Classification Search
CPC .... H04N 5/37452; H04N 5/353; H04N 5/361; H04N 5/37455; H04N 5/378; H04N 5/379
(Continued)

(56) References Cited

U.S. PATENT DOCUMENTS

| 2005/0157194 A1* | 7/2005 | Altice ................ H04N 5/35581 |
| | | 348/308 |
| 2007/0152247 A1* | 7/2007 | Lee ........................ H04N 5/341 |
| | | 257/291 |

(Continued)

FOREIGN PATENT DOCUMENTS

| JP | 2018-011272 A | 1/2018 |
| WO | 2016/136448 A1 | 9/2016 |
| WO | 2016/136486 A1 | 9/2016 |

OTHER PUBLICATIONS

International Search Report, International Application No. PCT/JP2019/010452, dated May 15, 2019.

*Primary Examiner* — Lin Ye
*Assistant Examiner* — Chan T Nguyen
(74) *Attorney, Agent, or Firm* — Michael Best & Friedrich LLP

(57) ABSTRACT

In a solid-state image sensor that transfers electric charges to a floating diffusion layer, exposure is started before transferring the electric charges to the floating diffusion layer. Electric charges are generated by photoelectric conversion in a photodiode and they are accumulated in an accumulation unit. An exposure end transfer transistor transfers the electric charges from the photodiode to the accumulation unit when a predetermined exposure period ends. A reset transistor initializes a voltage of a floating diffusion layer to a predetermined reset level when the exposure period ends. When a new exposure period is started after the electric charges are transferred to the accumulation unit, a discharge (Continued)

transistor discharges electric charges newly generated in the photodiode. When processing of converting a predetermined reset level into a digital signal ends, a conversion end transistor transfers the electric charges from the accumulation unit to the floating diffusion layer.

20 Claims, 26 Drawing Sheets

(51) Int. Cl.
*H04N 5/353* (2011.01)
*H04N 5/361* (2011.01)
*H04N 5/378* (2011.01)

(52) U.S. Cl.
CPC ............. *H04N 5/378* (2013.01); *H04N 5/379* (2018.08); *H04N 5/37455* (2013.01)

(58) Field of Classification Search
USPC .......................................................... 348/243
See application file for complete search history.

(56) References Cited

U.S. PATENT DOCUMENTS

| | | | |
|---|---|---|---|
| 2009/0309991 A1* | 12/2009 | Lim | H04N 5/3575 348/222.1 |
| 2014/0312207 A1* | 10/2014 | Ikeda | H04N 5/357 250/208.1 |
| 2016/0156863 A1* | 6/2016 | Kim | H04N 5/353 348/308 |
| 2016/0182842 A1* | 6/2016 | Mabuchi | H03M 1/56 348/308 |
| 2017/0163921 A1* | 6/2017 | Tsuboi | H04N 5/35581 |
| 2021/0321055 A1* | 10/2021 | Sakakibara | H04N 5/37455 |

* cited by examiner

SOLID-STATE IMAGE SENSOR, IMAGING DEVICE, AND METHOD OF CONTROLLING SOLID-STATE IMAGE SENSOR

TECHNICAL FIELD

The present technology relates to a solid-state image sensor, an imaging device, and a method of controlling a solid-state image sensor. Specifically, the present technology relates to a solid-state image sensor that accumulates electric charges in a floating diffusion layer, an imaging device, and a method of controlling a solid-state image sensor.

BACKGROUND ART

Conventionally, in a solid-state image sensor, a global shutter system has been used in which the start and end of exposure can be aligned for all pixels. For example, a solid-state image sensor that enables a global shutter system by providing an analog to digital (AD) converter in all pixels has been proposed (see Patent Document 1, for example). In this solid-state image sensor, a photodiode, a transfer transistor, a reset transistor, a discharge transistor, and the like are provided in the pixel in addition to the AD converter. The discharge transistor initializes the photodiode at the start of exposure, and the reset transistor initializes a floating diffusion layer immediately before the end of exposure. Then, at the end of exposure, the transfer transistor transfers electric charges from the photodiode to the floating diffusion layer. Additionally, the AD converter AD-converts the reset level at the time of initialization of the floating diffusion layer and the signal level at the time of transfer.

CITATION LIST

Patent Document

Patent Document 1: International Patent Application Publication No. 2016/136448

SUMMARY OF THE INVENTION

Problems To Be Solved By The Invention

The solid-state image sensor described above can capture image data without rolling shutter distortion by adopting the global shutter system. However, in the above-mentioned solid-state image sensor, there is a problem that the exposure cannot be started from immediately after the initialization of the floating diffusion layer to immediately before the transfer of electric charges, that is, within the period of AD conversion of the reset level. This is because if the photodiode is initialized before the electric charges corresponding to the exposure amount in the photodiode are transferred to the floating diffusion layer, the electric charges before AD conversion disappear and the image data is destroyed.

The present technology has been made in view of such a situation, and an object of the present technology is to, in a solid-state image sensor that transfers electric charges to a floating diffusion layer, start exposure before transferring the electric charges to the floating diffusion layer.

Solutions To Problems

The present technology has been made in order to solve the above problems, and a first aspect thereof is a solid-state image sensor including: a photodiode that generates electric charges by photoelectric conversion; an electric charge accumulation unit that accumulates the electric charges; a floating diffusion layer that converts the electric charges into a signal level corresponding to the amount of the electric charges; an exposure end transfer transistor that transfers the electric charges from the photodiode to the electric charge accumulation unit when a predetermined exposure period ends; a reset transistor that initializes a voltage of the floating diffusion layer to a predetermined reset level when the exposure period ends; a discharge transistor that, when a new exposure period is started after the electric charges are transferred to the electric charge accumulation unit, discharges electric charges newly generated in the photodiode; and a conversion end transfer transistor that, when processing of converting a predetermined reset level into a digital signal ends, transfers the electric charges from the electric charge accumulation unit to the floating diffusion layer, and a method of controlling the solid-state image sensor. This brings about an effect that electric charges are transferred from the photodiode to the electric charge accumulation unit before the electric charges are transferred to the floating diffusion layer.

Additionally, in the first aspect, the solid-state image sensor may further include an analog-to-digital converter that sequentially performs reset level conversion processing of converting the reset level into the digital signal, and signal level conversion processing of sequentially converting the signal level into a digital signal. This brings about the effect that the reset level and the signal level are sequentially converted into digital signals.

Additionally, in the first aspect, the photodiode, the electric charge accumulation unit, the floating diffusion layer, the exposure end transfer transistor, the discharge reset transistor, the conversion end transfer transistor, and the reset transistor may be arranged on a predetermined light receiving board, and at least a part of the analog-to-digital converter may be arranged on a predetermined circuit board stacked on the predetermined light receiving board. This brings about an effect that electric charges are transferred in the solid-state image sensor having a stacked structure.

Additionally, in the first aspect, the solid-state image sensor may further include a source follower transistor that has a gate connected to the floating diffusion layer and a drain connected to a power supply terminal, a selection transistor that outputs a signal from a source of the source follower transistor to the analog-to-digital converter according to a predetermined selection signal, and a cascode transistor that is cascode-connected to the selection transistor. This brings about an effect that the pixel signal of a selected pixel is read out.

Additionally, in the first aspect, the photodiode, the electric charge accumulation unit, the floating diffusion layer, the exposure end transfer transistor, the photodiode reset transistor, the conversion end transfer transistor, and the floating diffusion layer reset transistor may be arranged in each of multiple pixels. This brings about an effect that electric charges are transferred for each pixel.

Additionally, in the first aspect, the electric charge accumulation unit, the exposure end transfer transistor, and the conversion end transfer transistor may be arranged in each of multiple memory circuits sharing the photodiode and the floating diffusion layer. This brings about an effect that electric charges are transferred to any of multiple memory circuits.

Additionally, in the first aspect, the analog-to-digital converter may be arranged in each of the multiple pixels. As a result, exposure can be started simultaneously for all pixels.

Additionally, in the first aspect, the analog-to-digital converter may be arranged in each of multiple pixel blocks each including a predetermined number of pixels. This brings about an effect that exposure is started for any pixel in each pixel block.

Additionally, in the first aspect, the analog-to-digital converter may repeat the reset level conversion processing from the beginning in a case where the amount of the electric charges in the photodiode is initialized during the reset level conversion processing. This brings about an effect that offset is removed.

Additionally, in the first aspect, the analog-to-digital converter may repeat the signal level conversion processing from the beginning in a case where the amount of the electric charges in the photodiode is initialized during the signal level conversion processing. This brings about an effect that offset is removed.

Additionally, in the first aspect, the solid-state image sensor may further include a signal processing unit that performs correlated double sampling processing for obtaining, as image data, a difference between the digital signal obtained by converting the reset level and the digital signal obtained by converting the signal level. This brings about an effect that fixed pattern noise is removed.

Additionally, in the first aspect, the signal processing unit may further perform dark current correction for removing dark current from the image data. This brings about an effect that offset is removed.

Additionally, a second aspect of the present technology is an imaging device including: a photodiode that generates electric charges by photoelectric conversion; an electric charge accumulation unit that accumulates the electric charges; a floating diffusion layer that converts the electric charges into a signal level corresponding to the amount of the electric charges; an exposure end transfer transistor that transfers the electric charges from the photodiode to the electric charge accumulation unit when a predetermined exposure period ends; a reset transistor that initializes a voltage of the floating diffusion layer to a predetermined reset level when the exposure period ends; a discharge transistor that, when a new exposure period is started after the electric charges are transferred to the electric charge accumulation unit, discharges electric charges newly generated in the photodiode; a conversion end transfer transistor that, when processing of converting a predetermined reset level into a digital signal ends, transfers the electric charges from the electric charge accumulation unit to the floating diffusion layer; and a signal processing unit that processes the digital signal obtained by converting the reset level and a digital signal obtained by converting the signal level. This brings about an effect that electric charges are transferred from the photodiode to the electric charge accumulation unit and the digital signals are processed before the electric charges are transferred to the floating diffusion layer.

Effects Of The Invention

According to the present technology, in a solid-state image sensor that transfers electric charges to a floating diffusion layer, an excellent effect that exposure can be started before transferring electric charges to the floating diffusion layer can be achieved. Note that the effect described herein is not necessarily limited, and the effect may be any of those described in the present disclosure.

MODES FOR CARRYING OUT THE INVENTION

Hereinafter, modes for carrying out the present technology (hereinafter referred to as embodiments) will be described. The description will be given in the following order.

1. First embodiment (example in which electric charges are transferred from photodiode to analog memory)
2. Second embodiment (example in which electric charges are transferred from photodiode to analog memory in pixel of shared structure)
3. Third embodiment (example in which electric charges are transferred from photodiode to one of multiple analog memories)
4. Example of application to movable body

1. First Embodiment

Figure 1:
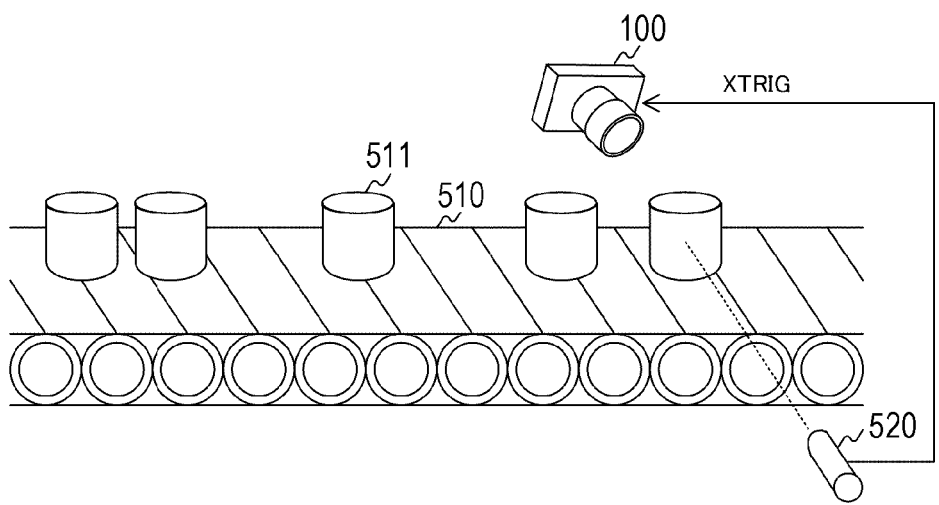
FIG. 1 is a diagram for describing a usage example of an imaging device according to a first embodiment of the present technology.

FIG. 1 is a diagram for describing a usage example of an imaging device 100 according to a first embodiment of the present technology. The imaging device 100 is used in a line inspection of factory automation, for example. In the line inspection, when a product 511 conveyed at high speed by a belt conveyor 510 reaches a predetermined position on a manufacturing line, a detection sensor 520 detects this state. As the detection sensor 520, an infrared sensor is used, for example.

Upon detection, the detection sensor 520 transmits a trigger signal XTRIG giving an instruction on the start of imaging to the imaging device 100, and the imaging device 100 images the product 511 and generates image data. Note, however, that the imaging device 100 cannot start the next exposure for a certain period immediately after the elapse of an exposure period in imaging. Such a period in which the next exposure cannot be started even if the trigger signal XTRIG is input is hereinafter referred to as a "dead period". Then, by analyzing the image data, the manufacturing system can inspect whether or not there is an abnormality in the product 511, for example.

Here, in a case where the product 511 is not necessarily conveyed by the belt conveyor 510 at regular intervals, the trigger signal XTRIG is generated randomly. Such a trigger signal is called a random trigger. In the case of performing imaging according to random triggers, a shorter dead period is more preferable from the viewpoint of performing line inspection at high speed.

Note that while the imaging device 100 is used for factory automation, the present invention is not limited to this example as long as imaging is performed at random timings. For example, in a crime prevention system, the imaging device 100 may start imaging when an infrared sensor detects a suspicious person or the like.

[Configuration Example of Imaging Device]

Figure 2:
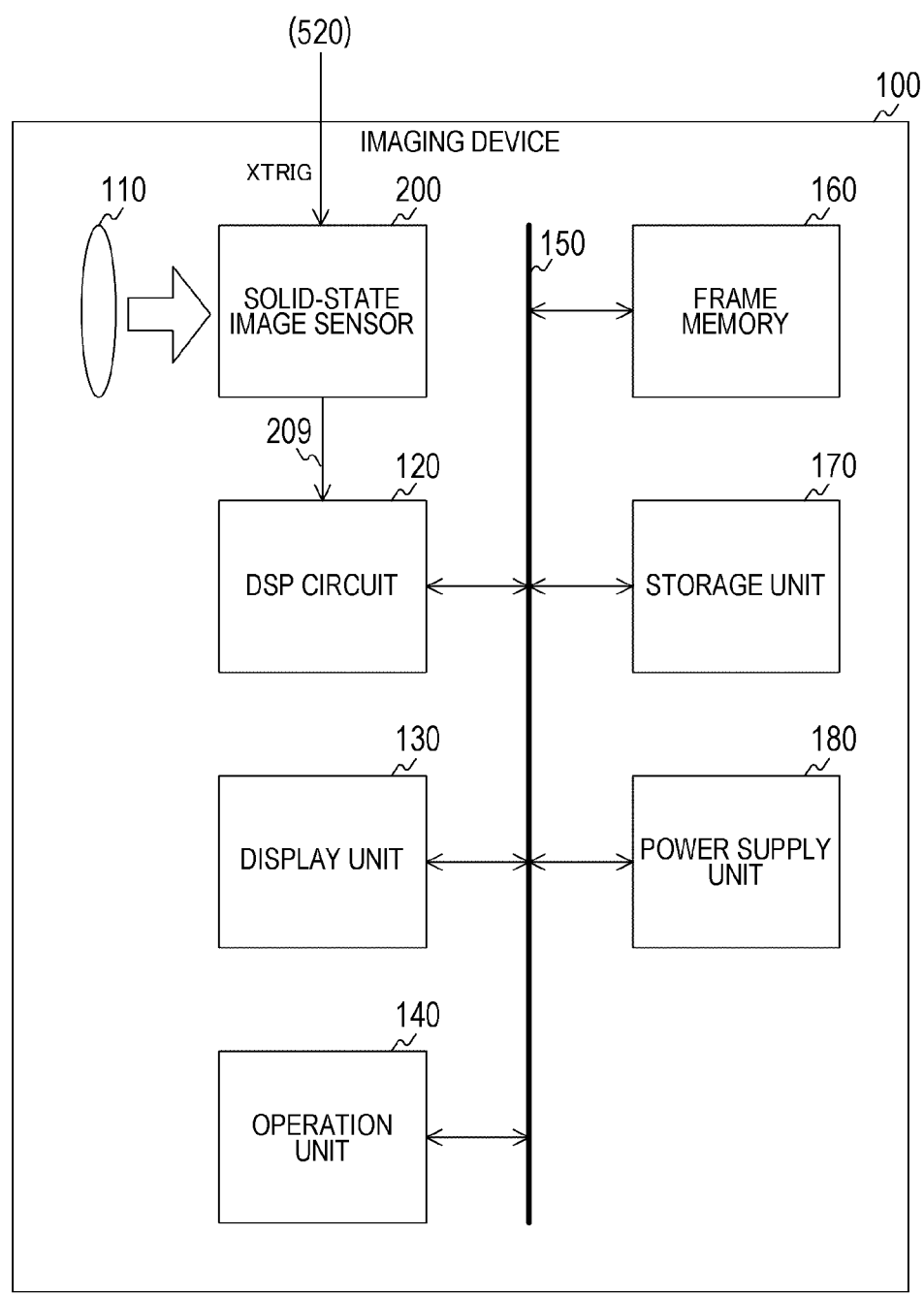
FIG. 2 is a block diagram showing a configuration example of the imaging device of the first embodiment of the present technology.

FIG. 2 is a block diagram showing a configuration example of the imaging device 100 of the first embodiment of the present technology. The imaging device 100 is a device for capturing image data, and includes an optical unit 110, a solid-state image sensor 200, and a digital signal processing (DSP) circuit 120. Moreover, the imaging device 100 includes a display unit 130, an operation unit 140, a bus 150, a frame memory 160, a storage unit 170, and a power supply unit 180.

The optical unit 110 collects light from a subject and guides it to the solid-state image sensor 200. The solid-state image sensor 200 captures image data when the trigger signal XTRIG is input. The solid-state image sensor 200 supplies the captured image data to the DSP circuit 120 through a signal line 209.

The DSP circuit 120 performs predetermined signal processing on the image data from the solid-state image sensor 200. The DSP circuit 120 outputs the processed image data to the frame memory 160 or the like through the bus 150.

The display unit 130 displays image data. As the display unit 130 a liquid crystal panel or an organic electro luminescence (EL) panel may be used, for example. The operation unit 140 generates an operation signal according to a user operation.

The bus 150 is a common path for the optical unit 110, the solid-state image sensor 200, the DSP circuit 120, the display unit 130, the operation unit 140, the frame memory 160, the storage unit 170, and the power supply unit 180 to exchange data with each other.

The frame memory 160 holds image data. The storage unit 170 stores various data such as image data. The power supply unit 180 supplies power to the solid-state image sensor 200, the DSP circuit 120, the display unit 130, and the like.

[Configuration Example of Solid-State Image Sensor]

Figure 3:
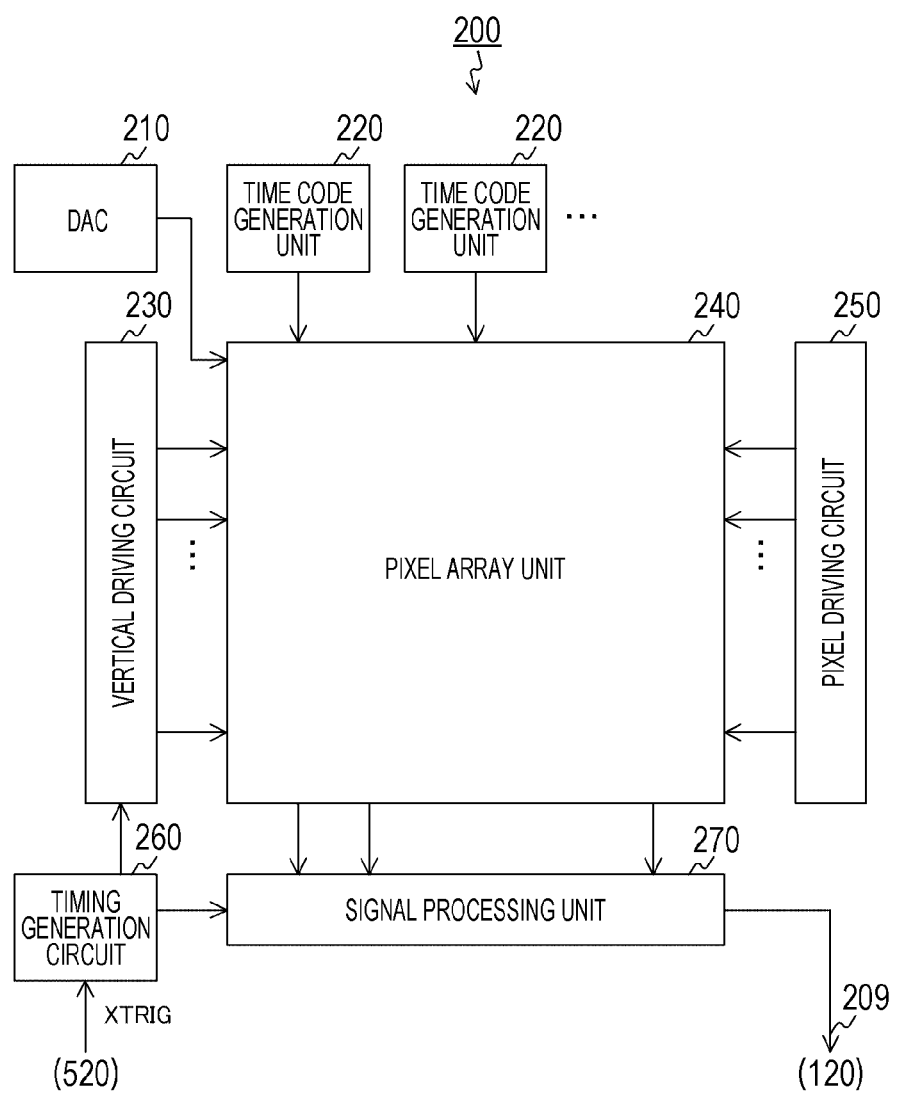
FIG. 3 is a block diagram showing a configuration example of a solid-state image sensor of the first embodiment of the present technology.

FIG. 3 is a block diagram showing a configuration example of the solid-state image sensor 200 of the first embodiment of the present technology. The solid-state image sensor 200 includes a digital to analog converter (DAC) 210 and multiple time code generation units 220. Additionally, the solid-state image sensor 200 also includes a vertical driving circuit 230, a pixel array unit 240, a pixel driving circuit 250, a timing generation circuit 260, and a signal processing unit 270. Additionally, in the pixel array unit 240, multiple pixels are arranged in a two-dimensional lattice shape.

The DAC 210 generates an analog reference signal that changes in a slope shape by digital to analog (DA) conversion. The DAC 210 supplies the reference signal to the pixel array unit 240.

The time code generation unit 220 generates a time code. The time code indicates the time within a period when the reference signal changes in a slope shape. The time code generation unit 220 supplies the generated time code to the pixel array unit 240.

The timing generation circuit 260 generates various timing signals when the trigger signal XTRIG is input and supplies the timing signals to the vertical driving circuit 230, the pixel driving circuit 250, the signal processing unit 270, and the like.

The vertical driving circuit 230 performs control to output pixel data generated in a pixel to the signal processing unit 270 in synchronization with a timing signal. The pixel driving circuit 250 drives pixels.

The signal processing unit 270 performs signal processing including correlated double sampling (CDS) processing on pixel data. The CDS processing removes fixed pattern noise from image data. The signal processing unit 270 outputs the processed pixel data to the DSP circuit 120. Note that a part or all of the processing in the signal processing unit 270 can be performed by a circuit (DSP circuit 120 or the like) outside the solid-state image sensor 200.

[Configuration Example of Pixel Array Unit]

Figure 4:
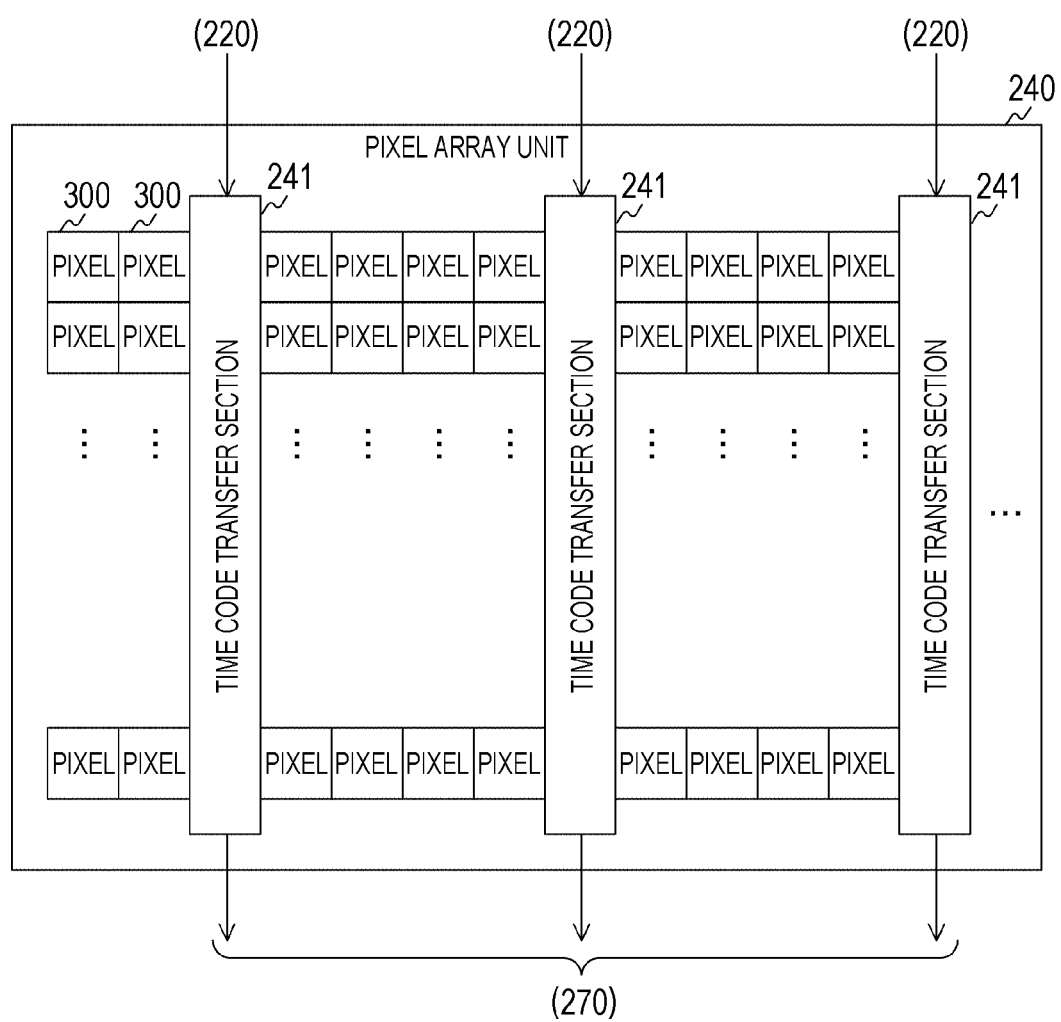
FIG. 4 is an example of a plan view of a pixel array unit of the first embodiment of the present technology.

FIG. 4 is a block diagram showing a configuration example of the pixel array unit 240 of the first embodiment of the present technology. The pixel array unit 240 includes multiple time code transfer sections 241 and multiple pixels 300. The time code transfer section 241 is arranged for each time code generation unit 220. Additionally, the pixels 300 are arranged in a two-dimensional lattice shape.

The time code transfer section 241 transfers the time code from the corresponding time code generation unit 220. The time code transfer section 241 transfers the time code from the corresponding time code generation unit 220 to the pixel 300, and transfers the time code from the pixel 300 to the signal processing unit 270 as pixel data. The pixel 300 generates pixel data.

<Configuration Example of Pixel>

Figure 5:
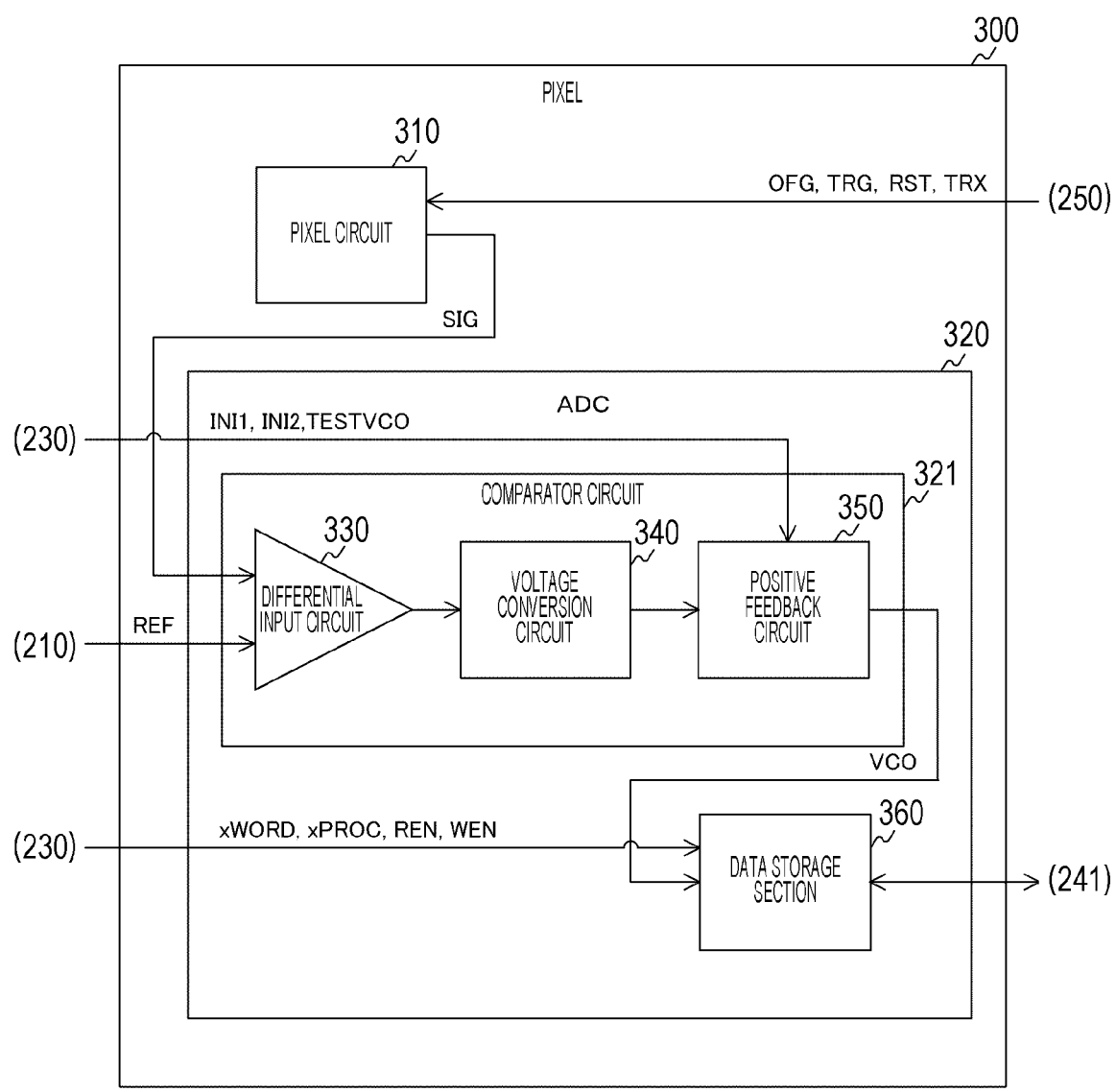
FIG. 5 is a block diagram showing a configuration example of a pixel of the first embodiment of the present technology.

FIG. 5 is a block diagram showing a configuration example of the pixel 300 of the first embodiment of the present technology. The pixel 300 includes a pixel circuit 310 and an ADC 320. The ADC 320 includes a comparator circuit 321 and a data storage section 360. Additionally, the comparator circuit 321 includes a differential input circuit 330, a voltage conversion circuit 340, and a positive feedback circuit 350.

The pixel circuit 310 generates a reset level or a signal level as a pixel signal SIG by photoelectric conversion. Here, the reset level is a voltage when the floating diffusion layer is initialized, and the signal level is a voltage when electric charges are transferred to the floating diffusion layer. The circuit configuration of the pixel circuit 310 including the floating diffusion layer will be described later. The pixel circuit 310 sequentially supplies the reset level and the signal level to the differential input circuit 330. The reset level will hereinafter be referred to as "P-phase level". Additionally, the signal level will hereinafter be referred to as "D-phase level".

The ADC 320 AD-converts the pixel signal SIG (P-phase level or D-phase level) into a digital signal. The digital signal obtained by AD-converting the P-phase level will hereinafter be referred to as "P-phase data". Additionally, the digital signal obtained by AD-converting the D-phase level will hereinafter be referred to as "D-phase data".

The differential input circuit 330 in the ADC 320 compares a reference signal REF from the DAC 210 with the pixel signal SIG from the pixel circuit 310. The differential input circuit 330 supplies a comparison result signal indicating the comparison result to the voltage conversion circuit 340.

The voltage conversion circuit 340 converts the voltage of the comparison result signal from the differential input circuit 330 and outputs it to the positive feedback circuit 350.

The positive feedback circuit 350 adds a part of its output to the input (comparison result signal), and outputs it as an output signal VCO to the data storage section 360.

The data storage section 360 holds the time code when the output signal VCO is inverted. The data storage section 360 outputs the time code corresponding to the P-phase level as P-phase data and the time code corresponding to the D-phase level as D-phase data.

Figure 6:
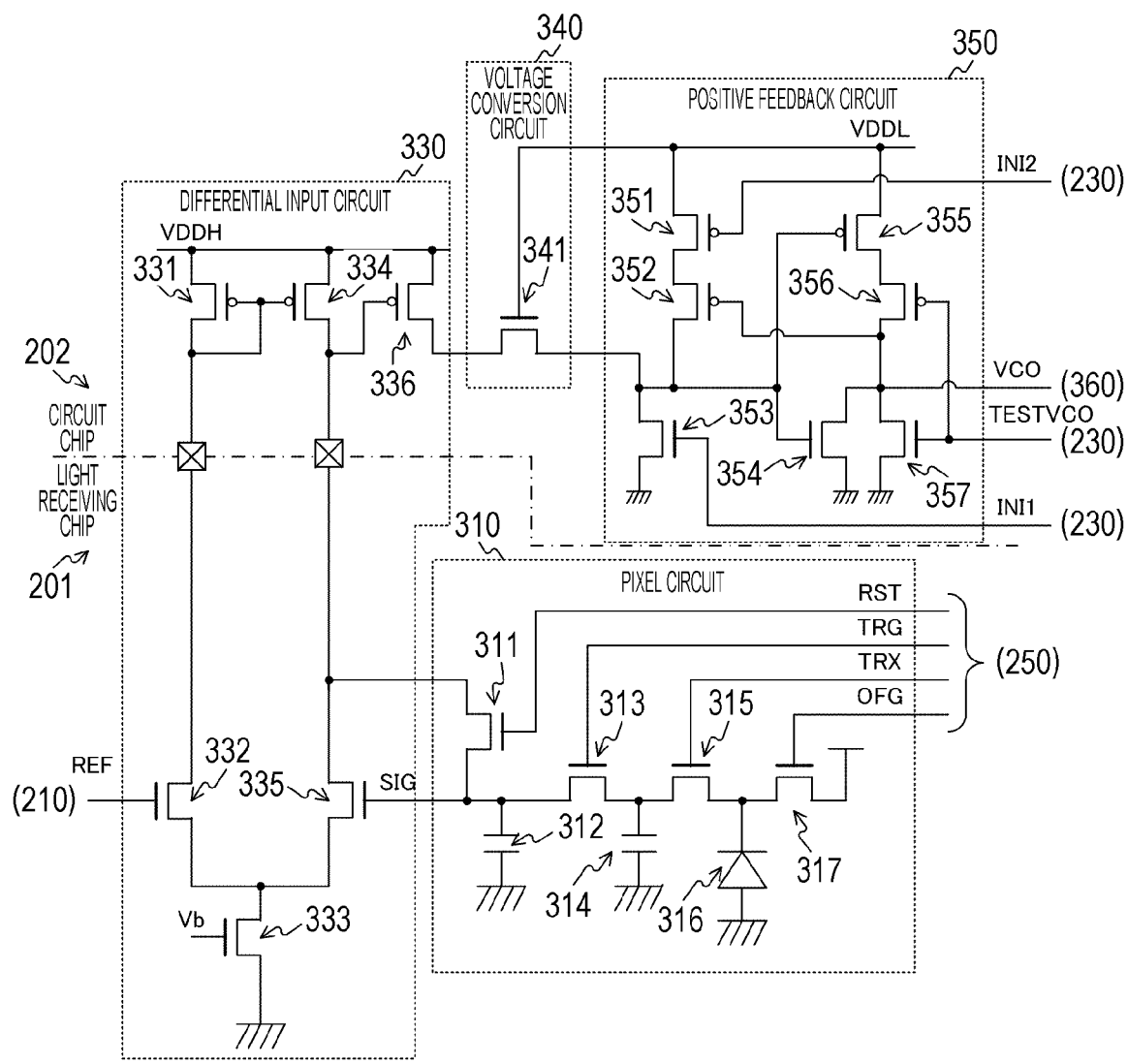
FIG. 6 is a circuit diagram showing a configuration example of a pixel circuit, a differential input circuit, a voltage conversion circuit, and a positive feedback circuit of the first embodiment of the present technology.

FIG. 6 is a circuit diagram showing a configuration example of the pixel circuit 310, the differential input circuit 330, the voltage conversion circuit 340, and the positive feedback circuit 350 of the first embodiment of the present technology.

The pixel circuit 310 includes a reset transistor 311, a floating diffusion layer 312, a transfer transistor 313, an analog memory 314, a transfer transistor 315, a photodiode 316, and a discharge transistor 317. N-type metal-oxide-semiconductor (MOS) transistors are used as the reset transistor 311, the transfer transistor 313, the transfer transistor 315, the photodiode 316, and the discharge transistor 317, for example.

The photodiode 316 generates electric charges by photoelectric conversion. The discharge transistor 317 discharges electric charges accumulated in the photodiode 316 according to a drive signal OFG from the pixel driving circuit 250. The discharging of electric charges initializes the photodiode 316.

The transfer transistor 315 transfers electric charges from the photodiode 316 to the analog memory 314 according to a transfer signal TRX from the pixel driving circuit 250. The transfer signal TRX is supplied at the end of an exposure period. Note that the transfer transistor 315 is an example of an exposure end transfer transistor described in the claims.

The analog memory 314 stores electric charges. While the analog memory 314 can be formed by the wiring capacitance in principle, it is desirable to use a buried-type capacitance capable of full depletion to enable transfer of electric charges to the floating diffusion layer 312. Note that the analog memory 314 is an example of an electric charge accumulation unit described in the claims.

The transfer transistor 313 transfers electric charges from the analog memory 314 to the floating diffusion layer 312 according to a transfer signal TRG from the pixel driving circuit 250. The transfer signal TRG is supplied when AD conversion of the P-phase level (reset level) is completed. Note that the transfer transistor 313 is an example of a conversion end transfer transistor described in the claims.

The floating diffusion layer 312 accumulates the transferred electric charges and generates a voltage according to the amount of the electric charges.

The reset transistor 311 initializes the voltage of the floating diffusion layer 312 to a reset level according to a reset signal RST from the pixel driving circuit 250. The reset signal RST is supplied at the end of an exposure period.

The differential input circuit 330 includes positive channel MOS (PMOS) transistors 331, 334, and 336 and negative channel MOS (NMOS) transistors 332, 333, and 335.

The NMOS transistors 332 and 335 form a differential pair, and the sources of these transistors are commonly connected to the drain of the NMOS transistor 333. Additionally, the drain of the NMOS transistor 332 is connected to the drain of the PMOS transistor 331 and the gates of the PMOS transistors 331 and 334. The drain of the NMOS transistor 335 is connected to the drain of the PMOS transistor 334, the gate of the PMOS transistor 336, and the drain of the reset transistor 311. Additionally, the reference signal REF is input to the gate of the NMOS transistor 332.

A predetermined bias voltage Vb is applied to the gate of the NMOS transistor 333, and a predetermined ground voltage is applied to the source of the NMOS transistor 333.

The PMOS transistors 331 and 334 form a current mirror circuit. A power supply voltage VDDH is applied to the sources of the PMOS transistors 331, 334, and 336. The power supply voltage VDDH is higher than a power supply voltage VDDL. Additionally, the drain of the PMOS transistor 336 is connected to the voltage conversion circuit 340.

The voltage conversion circuit 340 includes an NMOS transistor 341. The power supply voltage VDDL is applied to the gate of the NMOS transistor 341. Additionally, the drain of the NMOS transistor 341 is connected to the drain of the PMOS transistor 336, and the source of the NMOS transistor 341 is connected to the positive feedback circuit 350.

The positive feedback circuit 350 includes PMOS transistors 351, 352, 355, and 356 and NMOS transistors 353, 354, and 357. The PMOS transistors 351 and 352 are connected in series with the power supply voltage VDDL. Moreover, a drive signal INI2 from the vertical driving circuit 230 is input to the gate of the PMOS transistor 351. The drain of the PMOS transistor 352 is connected to the source of the NMOS transistor 341, the drain of the NMOS transistor 353, and the gates of the PMOS transistor 355 and the NMOS transistor 354.

The ground voltage is applied to the source of the NMOS transistor 353, and a drive signal INI1 from the vertical driving circuit 230 is input to the gate of the NMOS transistor 353.

The PMOS transistors 355 and 356 are connected in series with the power supply voltage VDDL. Additionally, the drain of the PMOS transistor 356 is connected to the gate of the PMOS transistor 352 and the drains of the NMOS transistors 354 and 357. A control signal TESTVCO from the vertical driving circuit 230 is input to the gates of the PMOS transistor 356 and the NMOS transistor 357.

The output signal VCO is output from the drains of the NMOS transistors 354 and 357. Additionally, the ground voltage is applied to the sources of the NMOS transistors 354 and 357.

Additionally, the NMOS transistors 332, 333, and 335 and the pixel circuit 310 are arranged on a light receiving chip 201. The PMOS transistors 331, 334, and 336 and the voltage conversion circuit 340 and following circuits are arranged on a circuit chip 202 stacked on the light receiving chip 201. These chips are electrically connected through a connection part such as a via. Note that other than vias, Cu-Cu bonding or bumps can be used for connection.

Note that while the light receiving chip 201 and the circuit chip 202 are separated in the differential input circuit 330, the separating part is not limited to this configuration. For example, the light receiving chip 201 and the circuit chip 202 can be separated at a connection point between the pixel circuit 310 and the differential input circuit 330. Additionally, while the circuits in the solid-state image sensor 200 have a stacked structure in which the circuits are dispersedly arranged on the light receiving chip 201 and the circuit chip 202 stacked on top of one another, the circuits may be arranged on one chip. Additionally, each of the differential input circuit 330, the voltage conversion circuit 340, and the positive feedback circuit 350 is not limited to the circuit illustrated in FIG. 6 as long as it has the function described in FIG. 5.

Here, a comparative example is assumed in which the analog memory 314 and the transfer transistor 315 are not provided, and the transfer transistor 313 transfers electric charges from the photodiode 316 to the floating diffusion layer 312. In the comparative example, exposure cannot be started during AD conversion (within so-called reading period). Before transfer of electric charges, that is, during the conversion of the P-phase level (reset level), electric charges corresponding to the exposure amount are still accumulated in the photodiode 316. Hence, if exposure is started at this time, the photodiode 316 will be initialized and image data will be destroyed. Additionally, if exposure is started during AD conversion of the D-phase level (signal level), analog fluctuation due to initialization of the photodiode 316 will adversely affect the AD conversion result. Since the ADC 320 is arranged in all the pixels, evenly offsetting the in-plane will result in different values in the frame. In order to prevent image data destruction and offset fluctuation, it is necessary to ignore the trigger signal XTRIG during AD conversion or start exposure after AD conversion is completed.

On the other hand, unlike the comparative example, the pixel circuit 310 further includes the analog memory 314 and the transfer transistor 315, and the transfer transistor 315 transfers electric charges to the analog memory 314 at the end of exposure. For this reason, even if the exposure is started (i.e., photodiode 316 is initialized) during AD conversion of the P-phase level, the electric charges in the analog memory 314 do not disappear. Additionally, offset fluctuation due to initialization of the photodiode 316 can be reduced by redoing of the AD conversion, which will be described later. Hence, the solid-state image sensor 200 can start exposure during AD conversion, and the dead period can be made shorter than in the comparative example.

With the configuration in which the analog memory 314 and the transfer transistor 315 are added, in a case where the AD conversion period is longer than the exposure period, the dead period is represented by the following formula.

(Dead period)=(transfer period)+(AD conversion period−exposure period)

In the above formula, "transfer period" is a period during which the transfer transistor 315 transfers the electric charges from the photodiode 316 to the analog memory 314.

On the other hand, in a case where the length of the AD conversion period is equal to or shorter than the exposure period, the transfer period is equal to the dead period. Accordingly, the dead period can be made even shorter by shortening the AD conversion period or the transfer period.

Note that the configuration of the ADC 320 is not limited to the configuration illustrated in FIGS. 5 and 6 as long as it can perform AD conversion. For example, a reset switch of the comparator circuit 321 for auto-zero drive or a DC blocking capacitor may be added.

Figure 7:
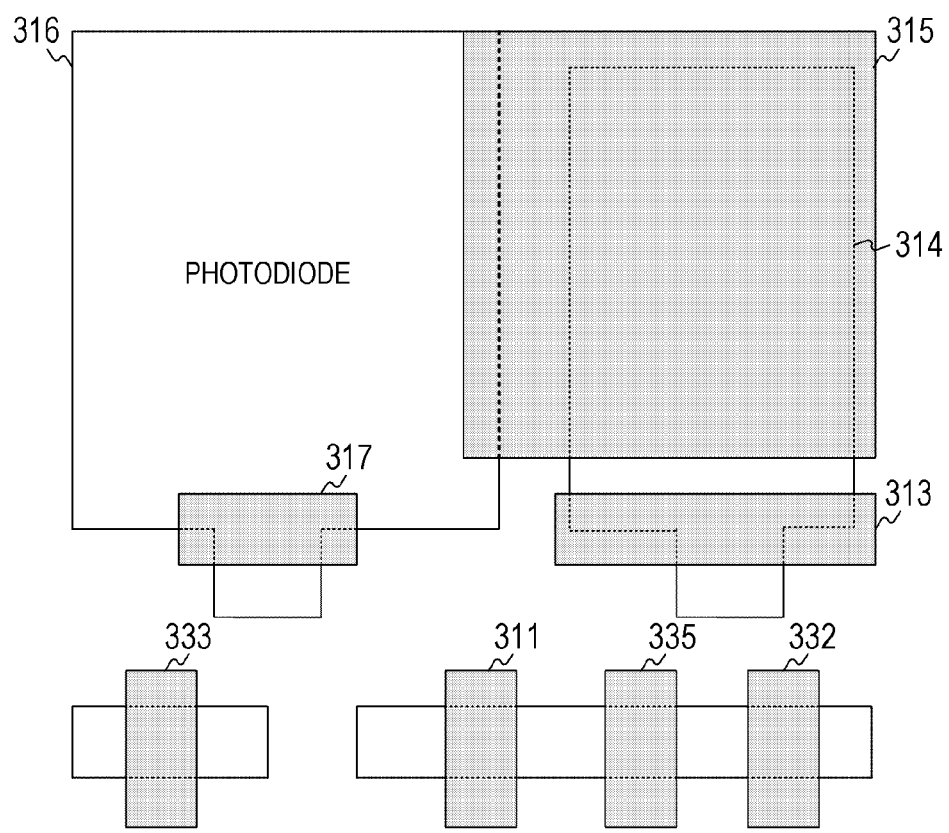
FIG. 7 is a diagram showing an example of a layout of elements in the pixel circuit of the first embodiment of the present technology.

FIG. 7 is a diagram showing an example of a layout of elements in the pixel circuit 310 according to the first embodiment of the present technology. The analog memory 314 is arranged adjacent to the photodiode 316, and the transfer transistor 315 is arranged at a position overlapping with the photodiode 316 and the analog memory 314. Additionally, the discharge transistor 317 is arranged at the discharge destination of the photodiode 316, and the transfer transistor 313 is arranged at the transfer destination of the analog memory 314.

Additionally, the NMOS transistor 333, the reset transistor 311, and the NMOS transistors 335 and 332 are arranged in a predetermined direction.

[Operation Example of Imaging Device]

Figure 8:
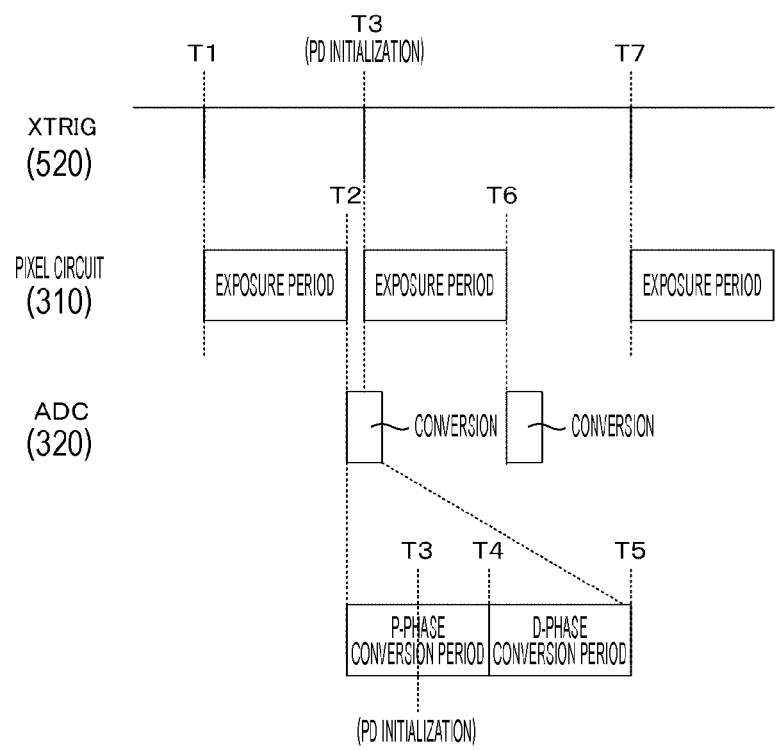
FIG. 8 is a timing chart showing an example of the operation of the imaging device of the first embodiment of the present technology.

FIG. 8 is a flowchart showing an example of the operation of the imaging device 100 of the first embodiment of the present technology. The detection sensor 520 generates the trigger signal XTRIG at random timings such as timings T1, T3, and T7, and inputs the trigger signal XTRIG to the imaging device 100.

On the other hand, in the pixel circuit 310 in the imaging device 100, all pixels are simultaneously exposed for a certain exposure period from timings T1, T3, and T7 of the trigger signal XTRIG. That is, the global shutter system is used. Additionally, at timings T2 and T6 when the exposure ends, the ADCs 320 of all the pixels sequentially convert the P-phase level and the D-phase level. For example, the ADC 320 converts the P-phase level during the period from timing T2 to T4 and converts the D-phase level during the period from timing T4 to T5. Note that, strictly speaking, there are a period required for initializing the photodiode 316 and the floating diffusion layer 312 and a transfer period required for transfer of electric charges. However, these periods are extremely short, and are therefore omitted in FIG. 8.

As described above, the electric charges of the photodiode 316 are transferred to the analog memory 314 at timing T2 when the exposure period ends. For this reason, at timing T3 during the conversion of the P-phase level from timing T2 to T4, even if the trigger signal XTRIG is input, the pixel circuit 310 can start the next new exposure period (i.e., can initialize photodiode 316).

As described above, in the solid-state image sensor 200, the pixel circuit 310 can concurrently start the next new exposure while the ADC 320 is performing AD conversion. In other words, the solid-state image sensor 200 can operate the ADC 320 and the pixel circuit 310 in parallel and perform pipeline driving.

Note that in a case where the trigger signal XTRIG is input during an exposure period, the solid-state image sensor 200 cannot start the next exposure because the electric charges in the photodiode 316 have not been transferred. In this case, the solid-state image sensor 200 waits until the exposure end timing before starting the next exposure, for example.

Figure 9:
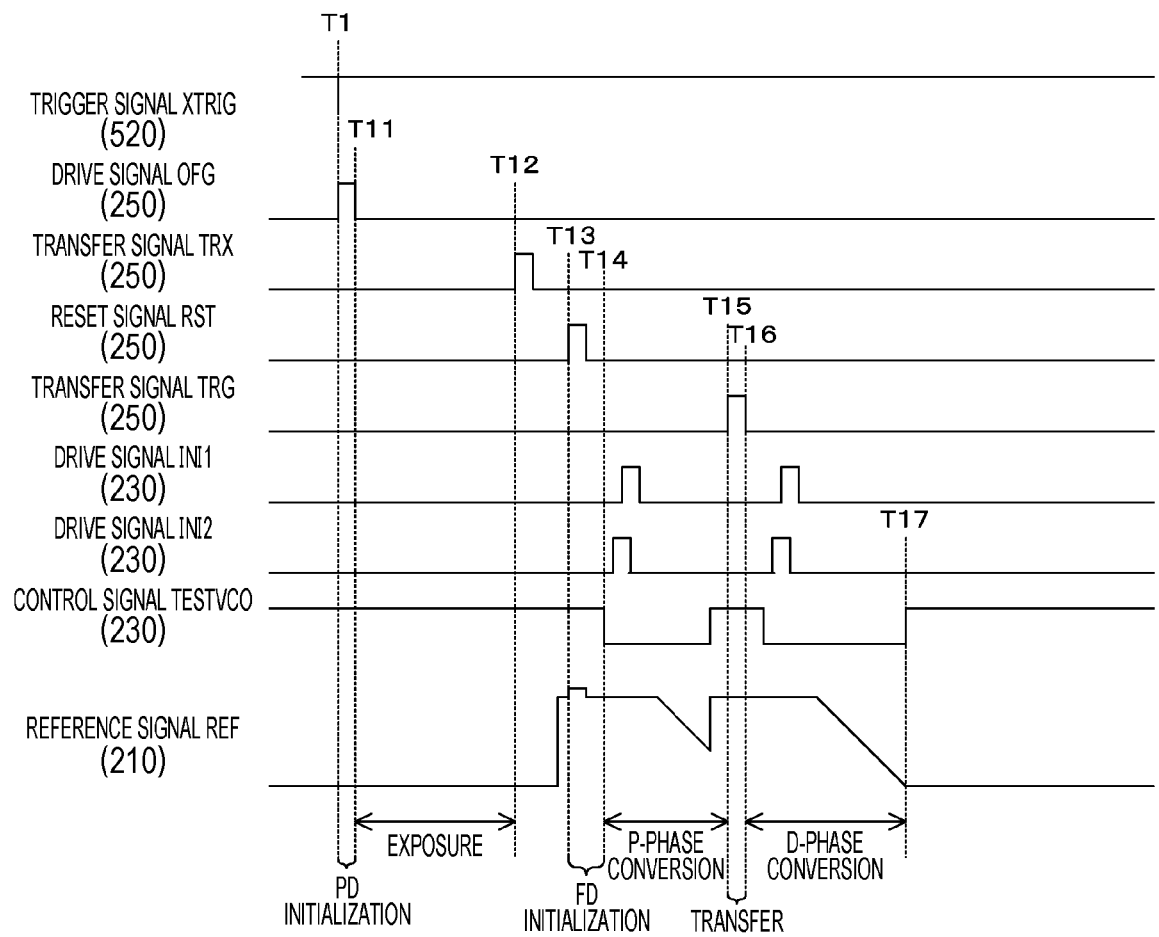
FIG. 9 is an example of a timing chart in a case where no trigger signal is input during AD conversion in the first embodiment of the present technology.

FIG. 9 is an example of a timing chart in a case where no trigger signal is input during AD conversion in the first embodiment of the present technology. When the trigger signal XTRIG is input at timing T1, the pixel driving circuit 250 supplies the high-level drive signal OFG until timing T11 when a predetermined pulse period elapses. As a result, the photodiode 316 is initialized.

Then, from timing T11 to timing T12 when a certain exposure period elapses, the photodiode 316 generates and accumulates electric charges by photoelectric conversion. The pixel driving circuit 250 supplies the high-level transfer signal TRX for a pulse period from timing T12 when the exposure ends. As a result, electric charges are transferred from the photodiode 316 to the analog memory 314.

Additionally, at timing T13 immediately after timing T12, the pixel driving circuit 250 supplies the high-level reset signal RST for a pulse period. As a result, the floating diffusion layer 312 is initialized.

Immediately after timing T14 when the initialization of the floating diffusion layer 312 ends, the vertical driving circuit 230 supplies the drive signals INI1 and INI2 and sets the control signal TESTVCO to the low level. The DAC 210 supplies a sawtooth reference signal REF. As a result, the P-phase level is AD-converted.

From timing T15 when the AD conversion of the P-phase level ends to timing T16 when the pulse period elapses, the pixel driving circuit 250 supplies the high-level transfer signal TRG. As a result, electric charges are transferred from the analog memory 314 to the floating diffusion layer 312.

Then, immediately after timing T16, the vertical driving circuit 230 supplies the drive signals INI1 and INI2 and sets the control signal TESTVCO to the low level. The DAC 210 supplies a sawtooth reference signal REF. As a result, the D-phase level is AD-converted.

After timing T17 when the conversion of the D-phase level ends, the signal processing unit 270 performs CDS processing for obtaining the difference between the P-phase data and the D-phase data as net pixel data.

Figure 10:
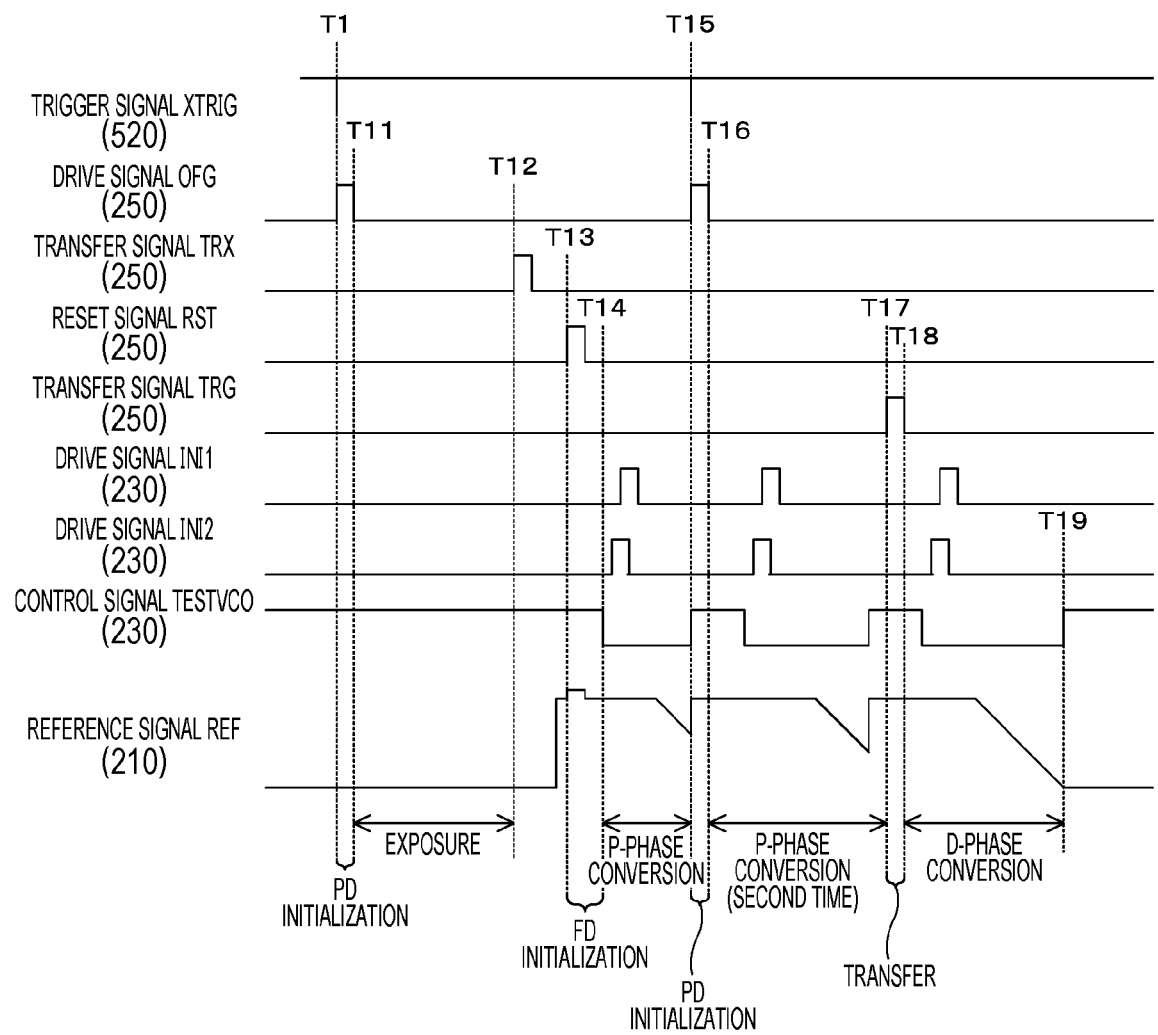
FIG. 10 is an example of a timing chart in a case where a trigger signal is input during conversion of a reset level in the first embodiment of the present technology.

FIG. 10 is an example of a timing chart in a case where a trigger signal is input during the conversion of the reset level in the first embodiment of the present technology. The control up to timing T14 when the initialization of the floating diffusion layer 312 ends is similar to that in FIG. 9.

When the trigger signal XTRIG is input at timing T15 during AD conversion of the P-phase level (reset level), the pixel driving circuit 250 supplies the high-level drive signal OFG until timing T16 when a predetermined pulse period elapses. As a result, the photodiode 316 is initialized.

It is known that if the photodiode 316 is initialized during the AD period as described above, the parasitic capacitance unit such as the floating node fluctuates, resulting in an incorrect AD conversion value. Against this background, in this case, the solid-state image sensor 200 stops the slope output of the P-phase level reference signal REF and redoes the operation from the start of the P-phase acquisition sequence.

For example, immediately after timing T16, the vertical driving circuit 230 supplies the drive signals INI1 and INI2 and sets the control signal TESTVCO to the low level. The DAC 210 supplies a sawtooth reference signal REF. As a result, the P-phase level is AD-converted. Note that by generating a pulse so that the pair of the drive signals INI1 and INI2 becomes high and low or low and high immediately after the initialization of the floating diffusion layer 312, it is possible to curb coupling of potentials of the analog signal and the floating node, for example.

Figure 11:
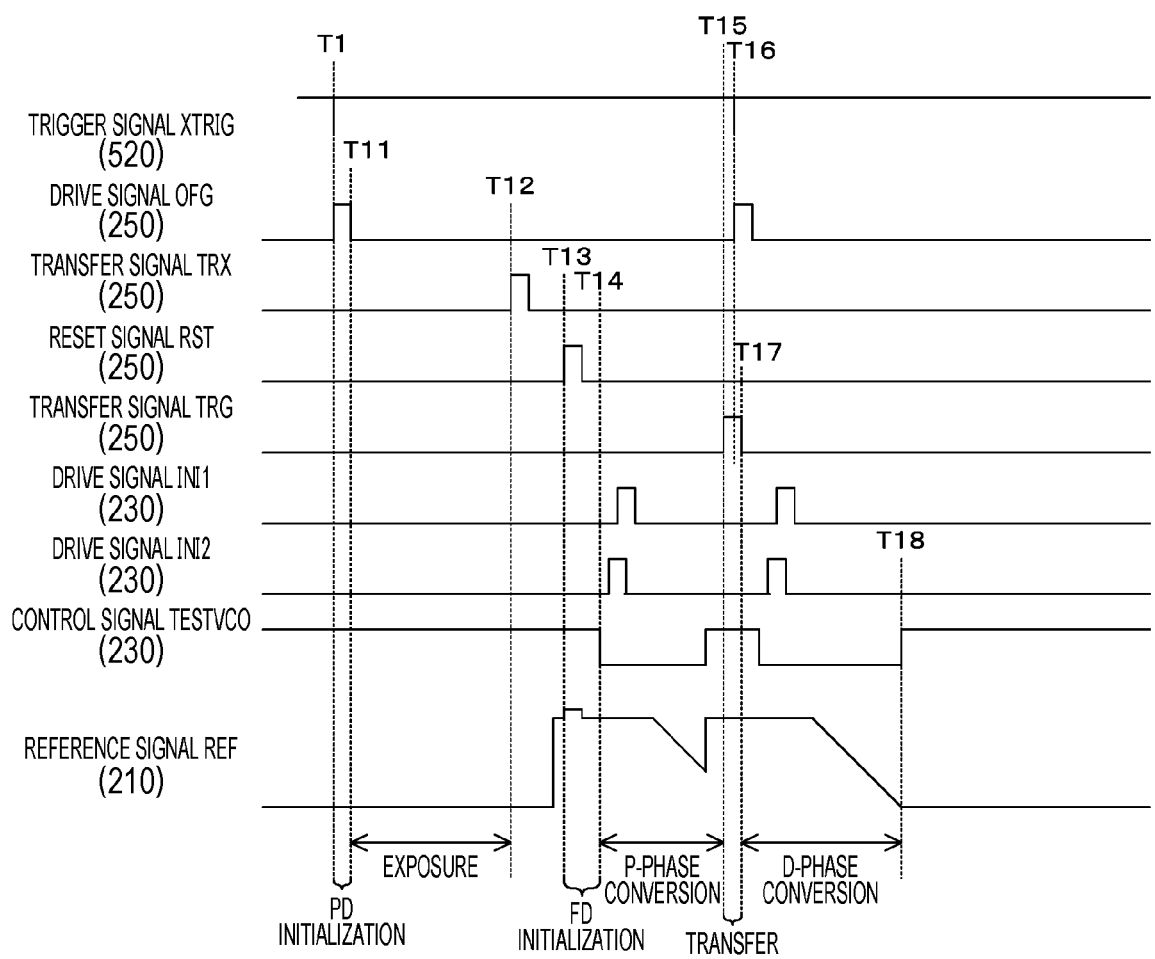
FIG. 11 is an example of a timing chart in a case where a trigger signal is input during transfer of electric charges in the first embodiment of the present technology.

FIG. 11 is an example of a timing chart in a case where a trigger signal is input during transfer of electric charges in the first embodiment of the present technology. The control up to timing T15 when the AD conversion of the P-phase level (reset level) ends is similar to that in FIG. 9. When the trigger signal XTRIG is input at timing T16 within the transfer period to the floating diffusion layer 312, the pixel driving circuit 250 supplies the high-level drive signal OFG until the pulse period elapses. As a result, the photodiode 316 is initialized. The control at and after timing T17 when the transfer of electric charges to the floating diffusion layer 312 ends is similar to that in FIG. 9.

Note that in a case where the trigger signal XTRIG is input during initialization of the floating diffusion layer 312, too, the photodiode 316 is initialized as in the case where the trigger signal XTRIG is input during transfer, and the AD conversion is not repeated.

Figure 12:
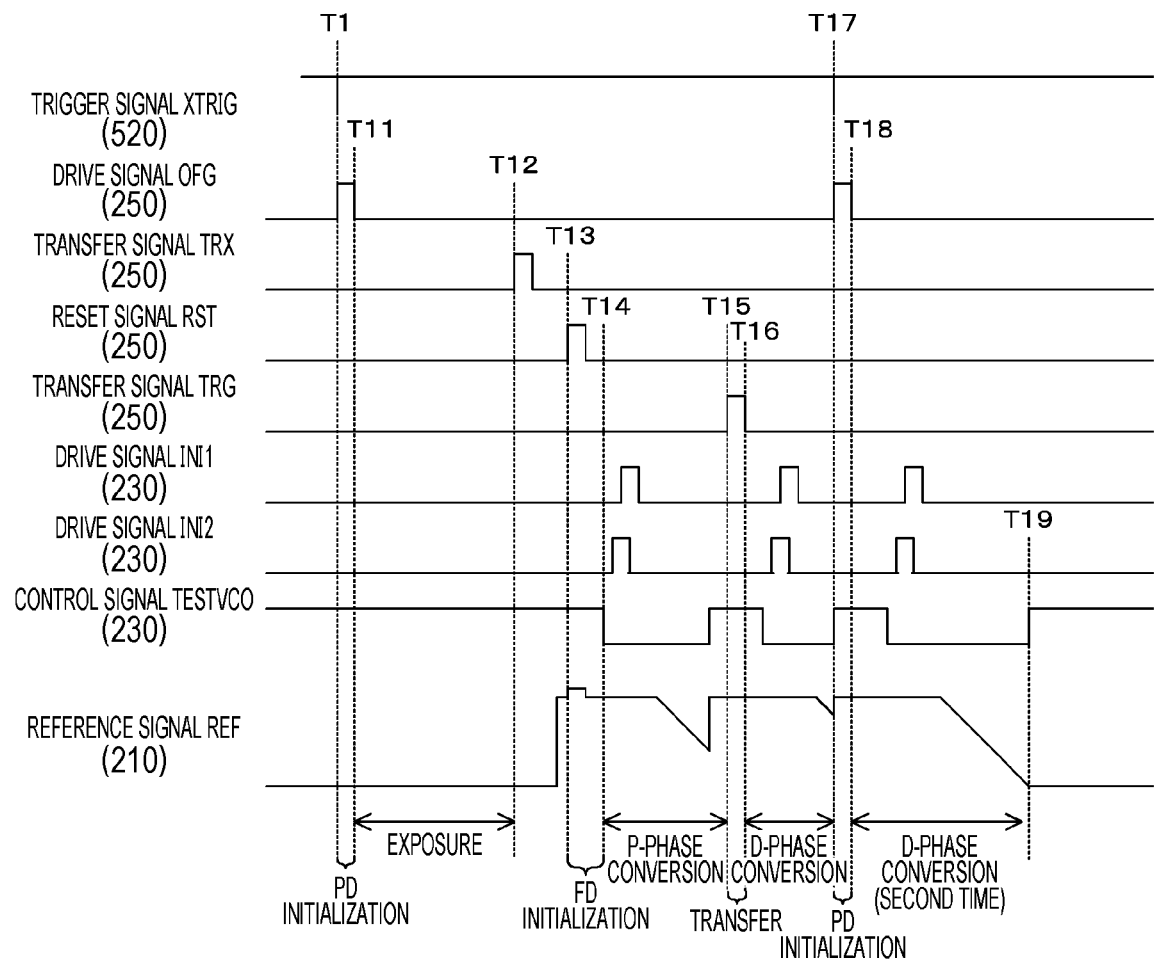
FIG. 12 is an example of a timing chart in a case where a trigger signal is input during signal level conversion in the first embodiment of the present technology.

FIG. 12 is an example of a timing chart in a case where a trigger signal is input during signal level conversion in the first embodiment of the present technology. The control up to timing T16 when the transfer of electric charges to the floating diffusion layer 312 ends is similar to that in FIG. 9. When the trigger signal XTRIG is input at timing T17 during AD conversion of the D-phase level (signal level), the pixel driving circuit 250 supplies the high-level drive signal OFG until timing T18 when a predetermined pulse period elapses. As a result, the photodiode 316 is initialized.

The solid-state image sensor 200 stops the slope output of the D-phase level reference signal REF and redoes the operation from the start of the D-phase acquisition sequence. For example, immediately after timing T18, the vertical driving circuit 230 supplies the drive signals INI1 and INI2 and sets the control signal TESTVCO to the low level. The DAC 210 supplies a sawtooth reference signal REF. As a result, the D-phase level is AD-converted.

Figure 13:
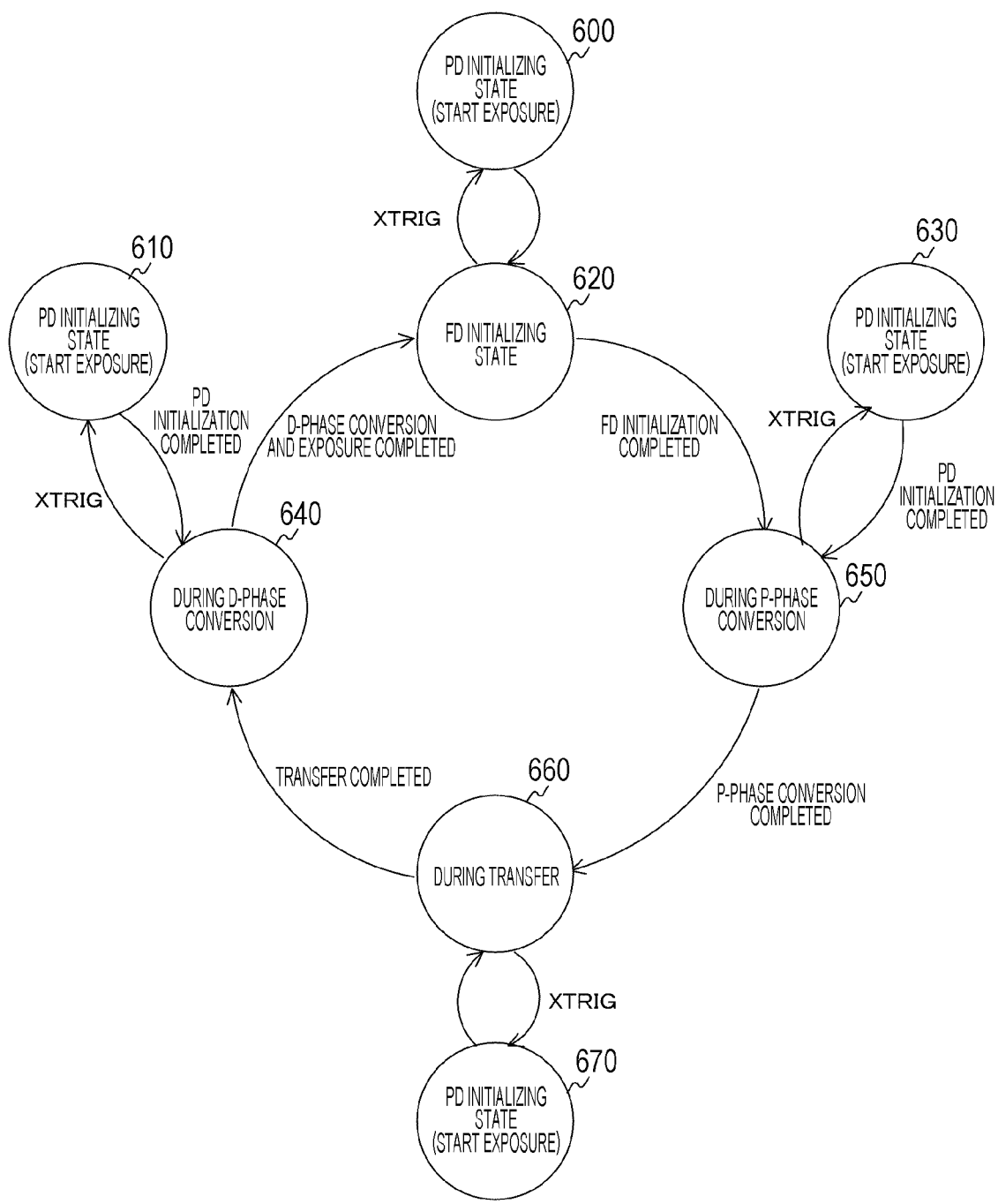
FIG. 13 is an example of a state transition diagram showing the operation of the solid-state image sensor of the first embodiment of the present technology.

FIG. 13 is an example of a state transition diagram showing the operation of the solid-state image sensor 200 of the first embodiment of the present technology.

When the exposure is completed, the solid-state image sensor 200 transfers the electric charges to the analog memory 314 and shifts to a state 620 where the floating diffusion layer 312 is initialized. When the trigger signal XTRIG is input during the initialization of the floating diffusion layer 312, the solid-state image sensor 200 shifts to a state 600 where the photodiode 316 is initialized (i.e., exposure is started) in parallel with the initialization of the floating diffusion layer 312.

When the initialization of the floating diffusion layer 312 is completed, the solid-state image sensor 200 shifts to a state 650 where the P-phase level (reset level) is AD-converted. When the trigger signal XTRIG is input during P-phase conversion, the solid-state image sensor 200 shifts to a state 630 where the photodiode 316 is initialized. When the initialization is completed, the solid-state image sensor 200 returns to the state 650 and repeats the P-phase conversion from the beginning.

Then, when the P-phase conversion is completed, the solid-state image sensor 200 shifts to a state 660 where electric charges are transferred to the floating diffusion layer 312. When the trigger signal XTRIG is input during the transfer to the floating diffusion layer 312, the solid-state image sensor 200 shifts to a state 670 where the photodiode 316 is initialized in parallel with the transfer of electric charges.

When the transfer to the floating diffusion layer 312 is completed, the solid-state image sensor 200 shifts to a state 640 where the D-phase level (signal level) is AD-converted. When the trigger signal XTRIG is input during D-phase conversion, the solid-state image sensor 200 shifts to a state 610 where the photodiode 316 is initialized. When the initialization is completed, the solid-state image sensor 200 returns to the state 640 and repeats the D-phase conversion from the beginning. When the D-phase conversion is completed, the solid-state image sensor 200 shifts to the state 620 after the exposure is completed.

Figure 14:
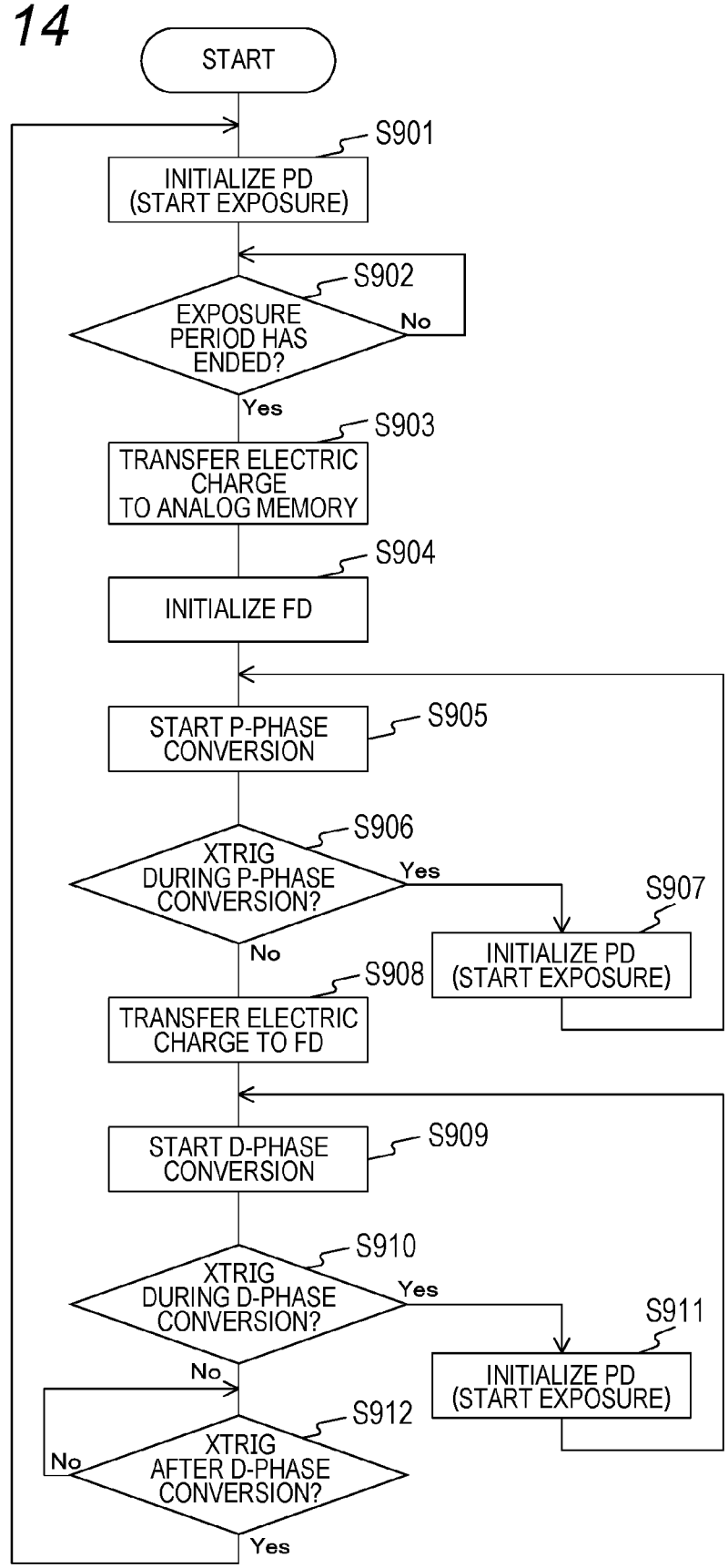
FIG. 14 is a flowchart showing an example of the operation of the imaging device of the first embodiment of the present technology.

FIG. 14 is a flowchart showing an example of the operation of the imaging device 100 of the first embodiment of the present technology. This operation is started when the trigger signal XTRIG is input, for example.

First, the solid-state image sensor 200 initializes the photodiode 316 and starts exposure (step S901). Then, the solid-state image sensor 200 determines whether or not the exposure period has ended (step S902). If the exposure period has not ended (step S902: No), the solid-state image sensor 200 repeats step S902.

If the exposure period has ended (step S902: Yes), the solid-state image sensor 200 transfers electric charges to the analog memory 314 (step S903) and initializes the floating diffusion layer 312 (step S904). Note that when the trigger signal XTRIG is input during the initialization of the floating diffusion layer 312, the photodiode 316 is initialized in parallel with the initialization of the floating diffusion layer 312.

The solid-state image sensor 200 starts AD conversion of the P-phase level (reset level) (step S905). Then, the solid-state image sensor 200 determines whether or not the trigger signal XTRIG is input during AD conversion of the P-phase level (step S906).

If the trigger signal XTRIG is input during AD conversion of the P-phase level (step S906: Yes), the solid-state image sensor 200 initializes the photodiode 316 (step S907), and repeats step S905 and subsequent steps.

On the other hand, if the trigger signal XTRIG is not input during the AD conversion of the P-phase level (step S906: No), the solid-state image sensor 200 transfers electric charges to the floating diffusion layer 312 (step S908) and starts AD conversion of the D-phase level (signal level) (step S909). Note that, if the trigger signal XTRIG is input during the transfer of electric charges, the photodiode 316 is initialized in parallel with the transfer of electric charges.

Then, the solid-state image sensor 200 determines whether or not the trigger signal XTRIG is input during the AD conversion of the D-phase level (step S910).

If the trigger signal XTRIG is input during AD conversion of the D-phase level (step S910: Yes), the solid-state image sensor 200 initializes the photodiode 316 (step S911), and repeats step S909 and subsequent steps.

On the other hand, if the trigger signal XTRIG is not input during AD conversion of the D-phase level (step S910: No), the solid-state image sensor 200 determines whether or not the trigger signal XTRIG is input after the conversion of the D-phase level (step S912). If the trigger signal XTRIG is not input after the conversion of the D-phase level (step S912: No), the solid-state image sensor 200 repeats step S912.

On the other hand, if the trigger signal XTRIG is input after the conversion of the D-phase level (step S912: Yes), the solid-state image sensor 200 repeatedly performs step S901 and subsequent steps.

As described above, according to the first embodiment of the present technology, since the transfer transistor 315 transfers electric charges from the photodiode 316 to the analog memory 314 when the exposure period ends, the exposure can be started before the transfer to the floating diffusion layer 312.

First Modification

In the above-described first embodiment, pixel data is read from all the pixels. However, since there is no selection transistor provided in each pixel, the first embodiment cannot support an application that reads pixel data from some of the pixels. A solid-state image sensor 200 of a first modification of the first embodiment is different from the first embodiment in that a selection transistor is added.

Figure 15:
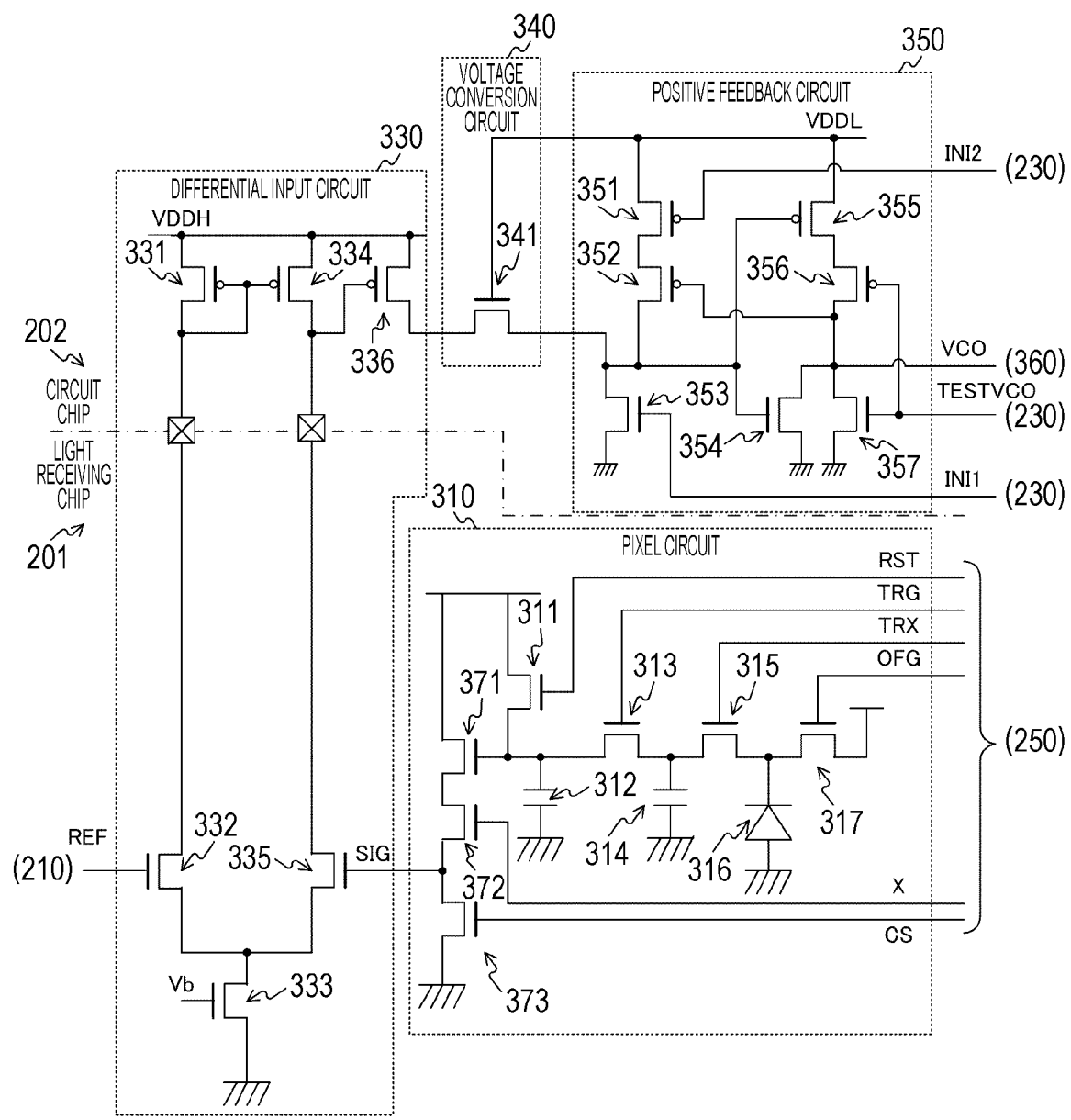
FIG. 15 is a circuit diagram showing a configuration example of a pixel circuit, a differential input circuit, a voltage conversion circuit, and a positive feedback circuit of a first modification of the first embodiment of the present technology.

FIG. 15 is a circuit diagram showing a configuration example of a pixel circuit 310, a differential input circuit 330, a voltage conversion circuit 340, and a positive feedback circuit 350 of the first modification of the first embodiment of the present technology. The pixel circuit 310 of the first modification of the first embodiment is different from the first embodiment in that it further includes a source follower transistor 371, a selection transistor 372, and a cascode transistor 373. For example, N-type MOS transistors are used as these transistors.

The source follower transistor 371 is included in a source follower circuit. For example, the gate of the source follower transistor 371 is connected to a floating diffusion layer 312, the drain of the source follower transistor 371 is connected to a power supply terminal, and the source of the source follower transistor 371 is connected to the drain of the selection transistor 372.

The selection transistor 372 outputs a signal from the source of the source follower transistor 371 to the differential input circuit 330 as a pixel signal SIG, according to a selection signal X from the pixel driving circuit 250.

The cascode transistor 373 is a transistor cascode-connected to the selection transistor 372. A drive signal CS from the pixel driving circuit 250 is input to the gate of the cascode transistor 373. The drive signal CS can control the amplification factor of the pixel circuit 310.

Note that while a light receiving chip 201 and a circuit chip 202 are separated in the differential input circuit 330 in the first modification of the first embodiment, too, the separating part is not limited to this configuration. For example, the light receiving chip 201 and the circuit chip 202 can be separated at a connection point between the pixel circuit 310 and the differential input circuit 330.

As described above, according to the first modification of the first embodiment of the present technology, since the selection transistor 372 that outputs the pixel signal SIG according to the selection signal is added, it is possible to selectively read the pixel data of some of the pixels.

Second Modification

In the above-described first embodiment, when the trigger signal XTRIG is input during AD conversion of the P-phase level or the D-level, the AD conversion is redone to remove offset due to initialization of the photodiode 316 (i.e., start of exposure). However, the read time becomes longer because of the additional AD conversion. A second modification of the first embodiment is different from the first embodiment in that, when a trigger signal XTRIG is input during AD conversion, exposure is started after waiting until the end of the AD conversion, so that the need for additional AD conversion is eliminated.

Figure 16:
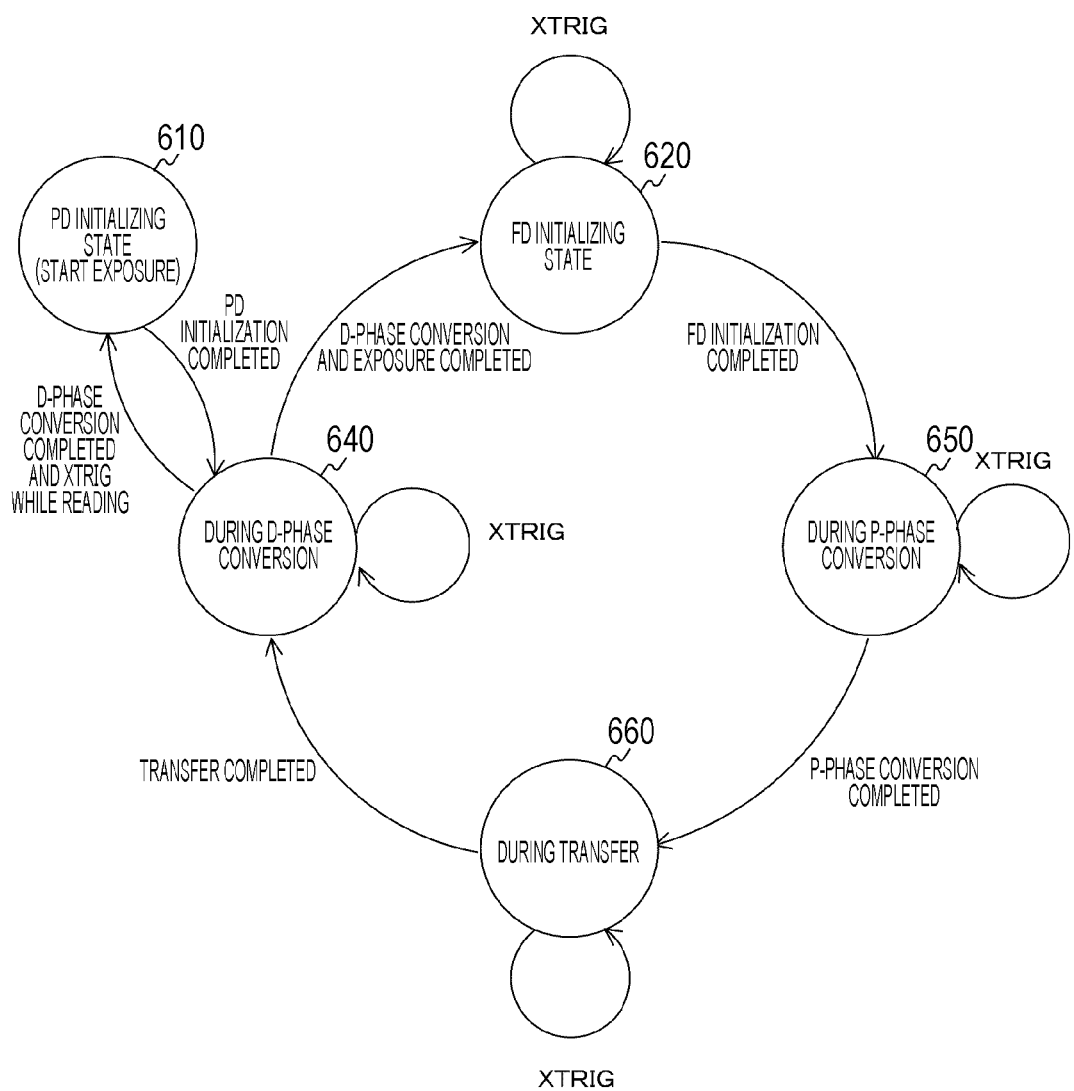
FIG. 16 is an example of a state transition diagram of a second modification of the first embodiment of the present technology.

FIG. 16 is an example of a state transition diagram of the second modification of the first embodiment of the present technology. When the trigger signal XTRIG is input in either a state 620 during initialization of a floating diffusion layer 312 or a state 650 during AD conversion of the P-phase level, a solid-state image sensor 200 does not start exposure at that point, and does not perform additional AD conversion. Additionally, when the trigger signal XTRIG is input in either a state 660 during transfer of electric charges or a state 640 during AD conversion of the D-phase level, the solid-state image sensor 200 similarly does not start exposure at that point, and does not perform additional AD conversion. Then, in these cases, the solid-state image sensor 200 starts exposure when the conversion of the D-phase level is completed.

Figure 17:
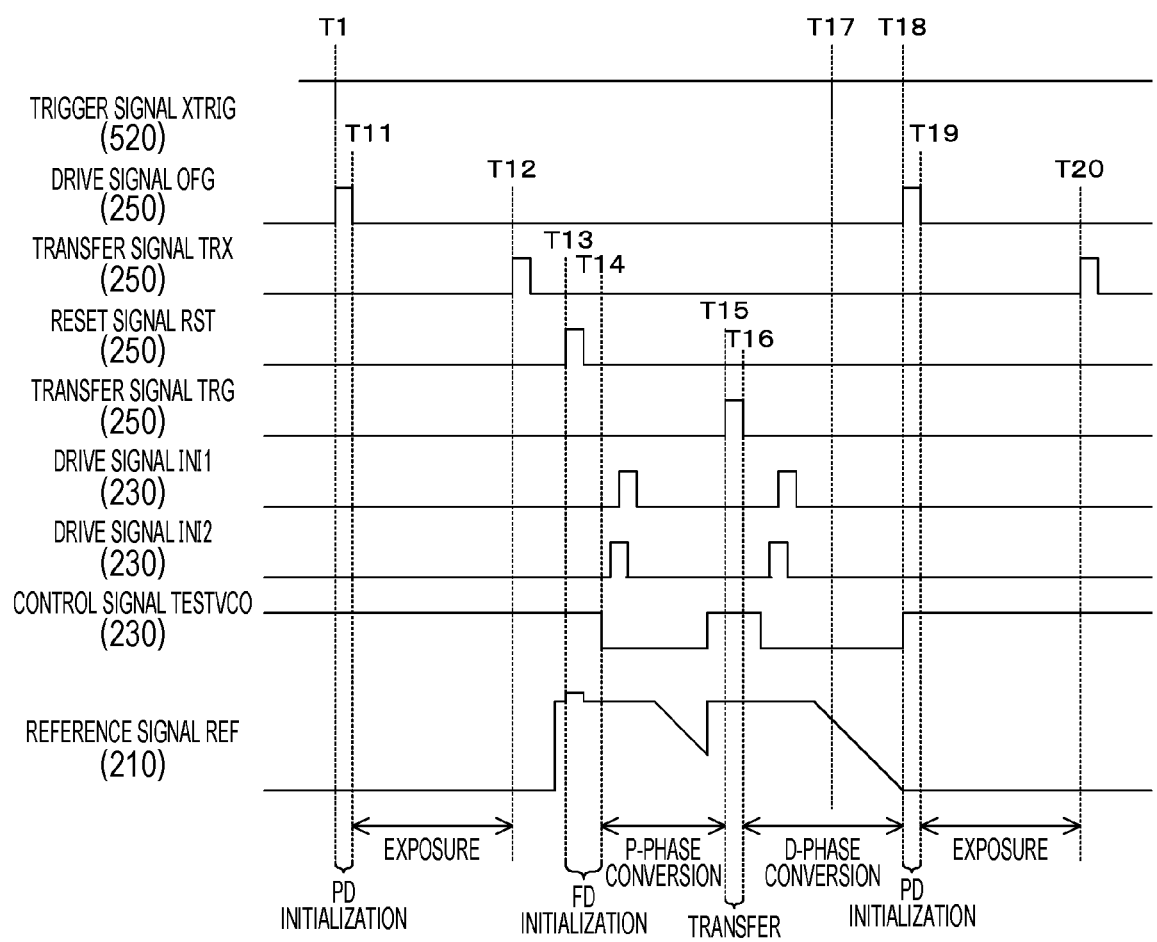
FIG. 17 is a timing chart of the second modification of the first embodiment of the present technology.

FIG. 17 is a timing chart of the second modification of the first embodiment of the present technology. In FIG. 17, the control up to timing T16 when the transfer of electric charges to the floating diffusion layer 312 ends is similar to that in FIG. 9.

When the trigger signal XTRIG is input at timing T17 during AD conversion of the D-phase level (signal level), the solid-state image sensor 200 temporarily holds a flag indicating that the trigger signal XTRIG has been input in its internal register or the like. Additionally, the AD conversion is not redone. Then, at timing T18 when the AD conversion of the D-phase level ends, on the basis of the flag, the pixel driving circuit 250 supplies a high-level drive signal OFG until timing T19 when a pulse period elapses. As a result, the photodiode 316 is initialized.

As described above, according to the second modification of the first embodiment of the present technology, when the trigger signal XTRIG is input during AD conversion, the solid-state image sensor 200 waits until the end of the AD conversion before starting the next exposure. This eliminates the need for additional AD conversion, and thus the read time can be made shorter than the first embodiment in which additional AD conversion is performed.

Third Modification

In the above-described first embodiment, when the trigger signal XTRIG is input during AD conversion of the P-phase level or the D-phase level, the AD conversion is redone to remove offset due to initialization of the photodiode 316 (i.e., start of exposure). However, in a case where dark current correction is performed, the dark current correction sufficiently removes offset. Hence, the need for redoing AD conversion is eliminated. A third modification of the first embodiment is different from the first embodiment in that exposure is started without performing additional AD conversion, and offset is removed by dark current correction.

Figure 18:
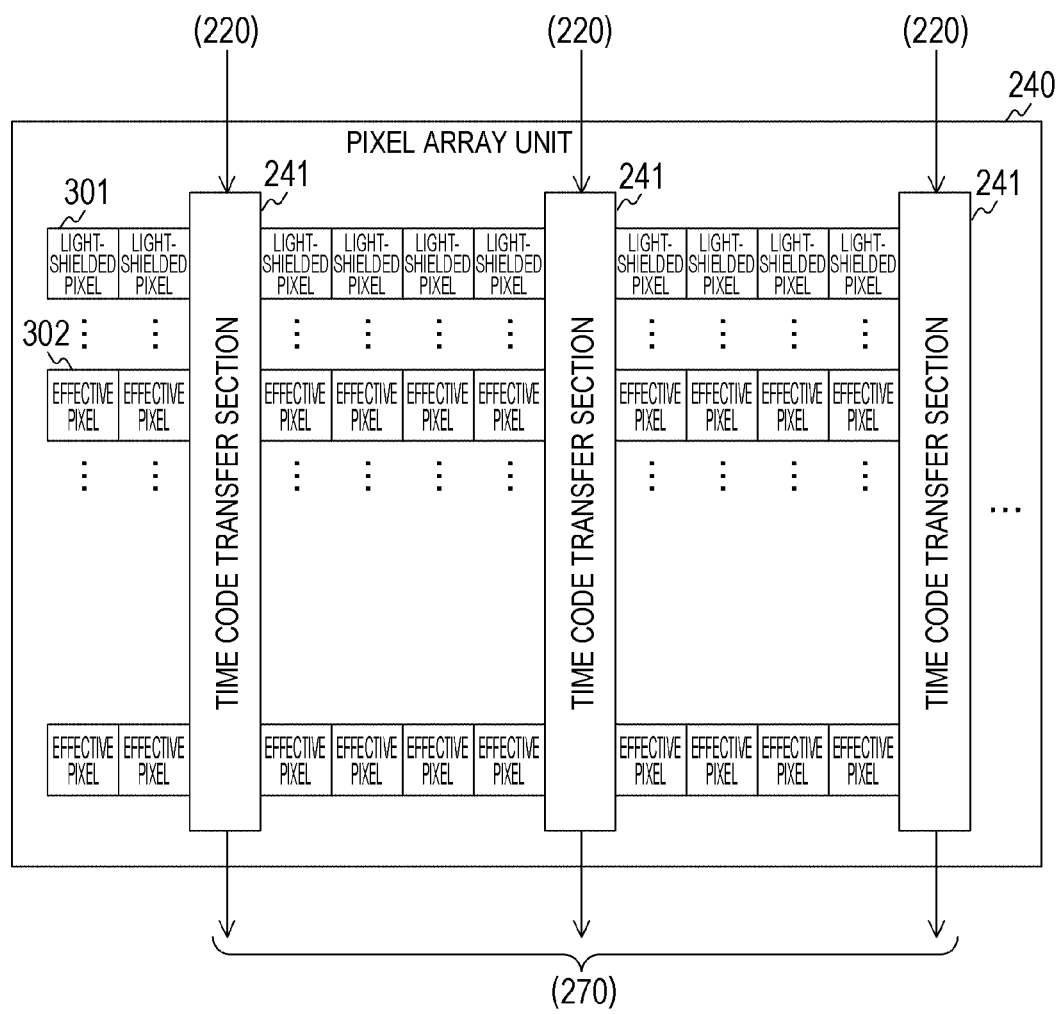
FIG. 18 is an example of a plan view of a pixel array unit of a third modification of the first embodiment of the present technology.

FIG. 18 is an example of a plan view of a pixel array unit 240 of the third modification of the first embodiment of the present technology. The pixel array unit 240 of the third modification of the first embodiment is different from the first embodiment in that multiple light-shielded pixels 301 and multiple effective pixels 302 are arranged in a two-dimensional lattice shape.

The light-shielded pixel 301 is a pixel shielded from light, and the effective pixel 302 is a pixel not shielded from light. The configurations of the light-shielded pixel 301 and the effective pixel 302 are the similar to that of the pixel 300 of the first embodiment.

Additionally, the light-shielded pixels 301 are arranged in a different row from the effective pixels 302, for example. Note that the light-shielded pixels 301 may further be arranged in a different column from the effective pixels 302.

Figure 19:
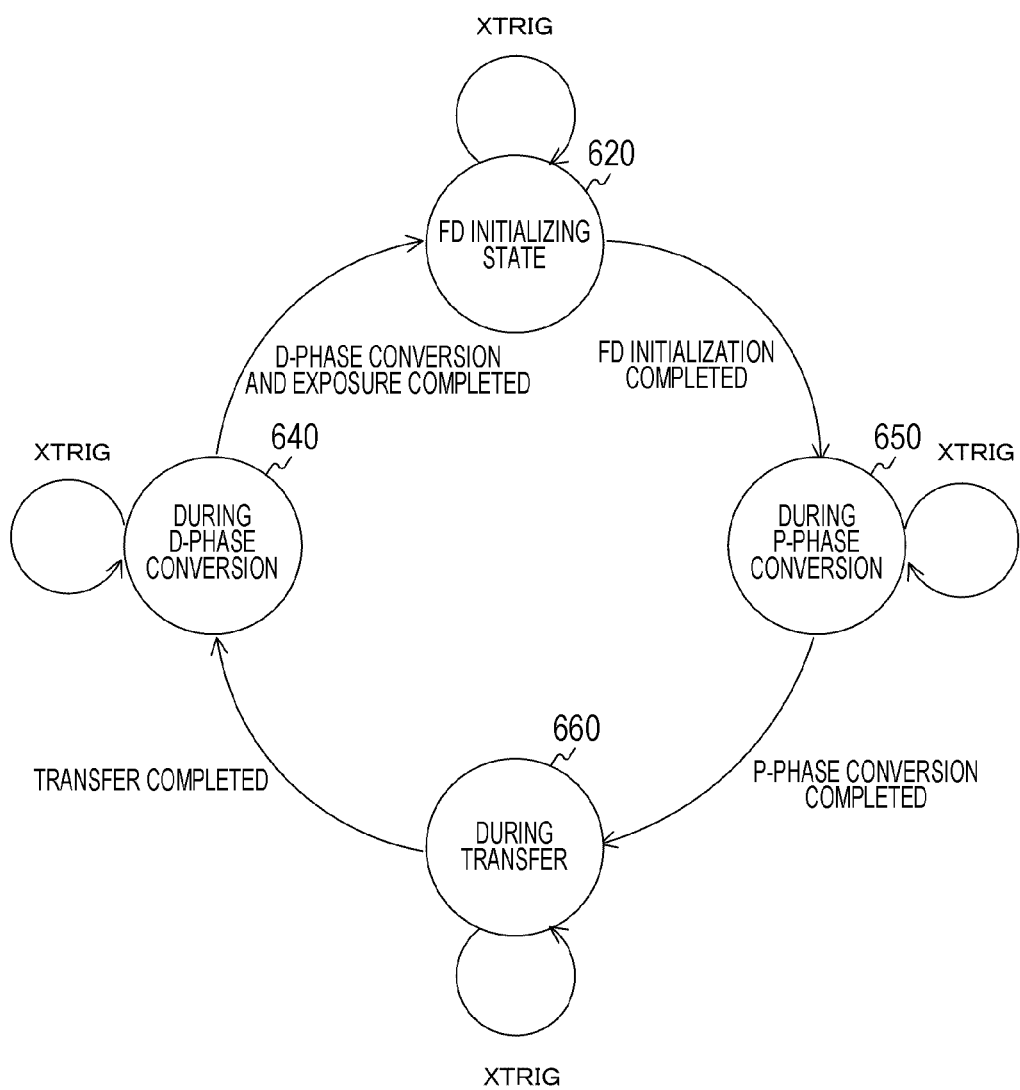
FIG. 19 is an example of a state transition diagram of the third modification of the first embodiment of the present technology.

FIG. 19 is an example of a state transition diagram of the third modification of the first embodiment of the present technology.

When a trigger signal XTRIG is input in either a state 620 during initialization of a floating diffusion layer 312 or a state 650 during AD conversion of the P-phase level, a solid-state image sensor 200 starts exposure at that point, and does not perform additional AD conversion. Additionally, when the trigger signal XTRIG is input in either a state 660 during transfer of electric charges or a state 640 during AD conversion of the D-phase level, the solid-state image sensor 200 similarly starts exposure at that point, and does not perform additional AD conversion.

Figure 20:
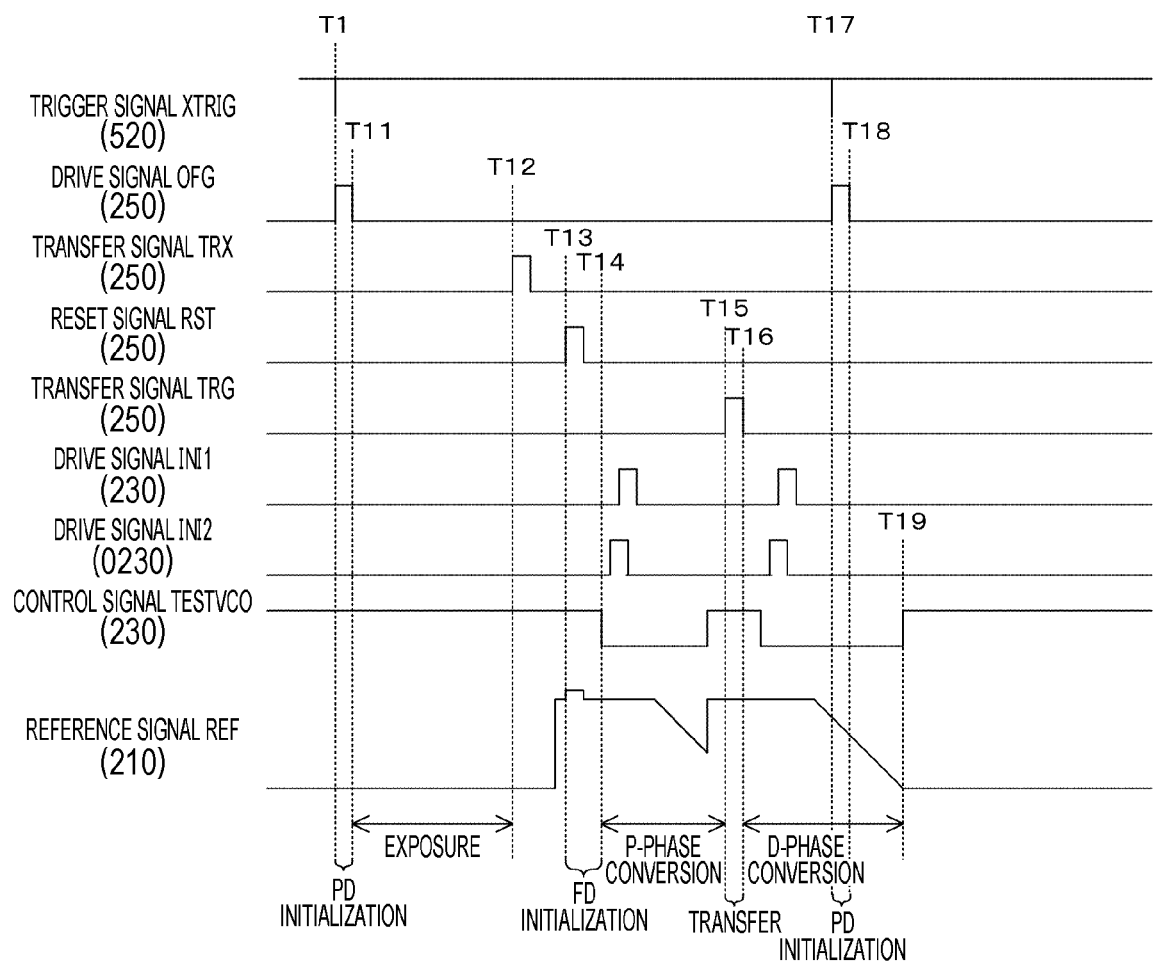
FIG. 20 is a timing chart of the third modification of the first embodiment of the present technology.

FIG. 20 is a timing chart of the third modification of the first embodiment of the present technology. The control up to timing T16 when the transfer of electric charges to the floating diffusion layer 312 ends is similar to that in FIG. 9.

When the trigger signal XTRIG is input at timing T17 during AD conversion of the D-phase level (signal level), the pixel driving circuit 250 supplies a high-level drive signal OFG until timing T18 when a pulse period elapses. As a result, the photodiode 316 is initialized. On the other hand, AD conversion of the D-phase level is continuously performed in parallel with the initialization of the photodiode 316.

Additionally, after the D-phase conversion, a signal processing unit 270 obtains the dark current from light-shielded pixel data of the light-shielded pixel 301, and performs dark current correction for removing the dark current from effective pixel data of the effective pixel 302. As a result, offset is removed. This eliminates the need for additional AD conversion for offset removal.

As described above, according to the third modification of the first embodiment of the present technology, since the signal processing unit 270 performs dark current correction for removing dark current from effective pixel data of the effective pixel 302, the need for additional AD conversion for offset removal is eliminated. As a result, the read time can be made shorter than the first embodiment in which additional AD conversion is performed.

2. Second Embodiment

While the ADC 320 is arranged for each pixel in the above-described first embodiment, the number of ADCs 320 increases as the number of pixels increases, which may increase the cost and the circuit scale. A solid-state image sensor 200 of a second embodiment is different from the first embodiment in that multiple pixels 300 share one ADC 320.

Figure 21:
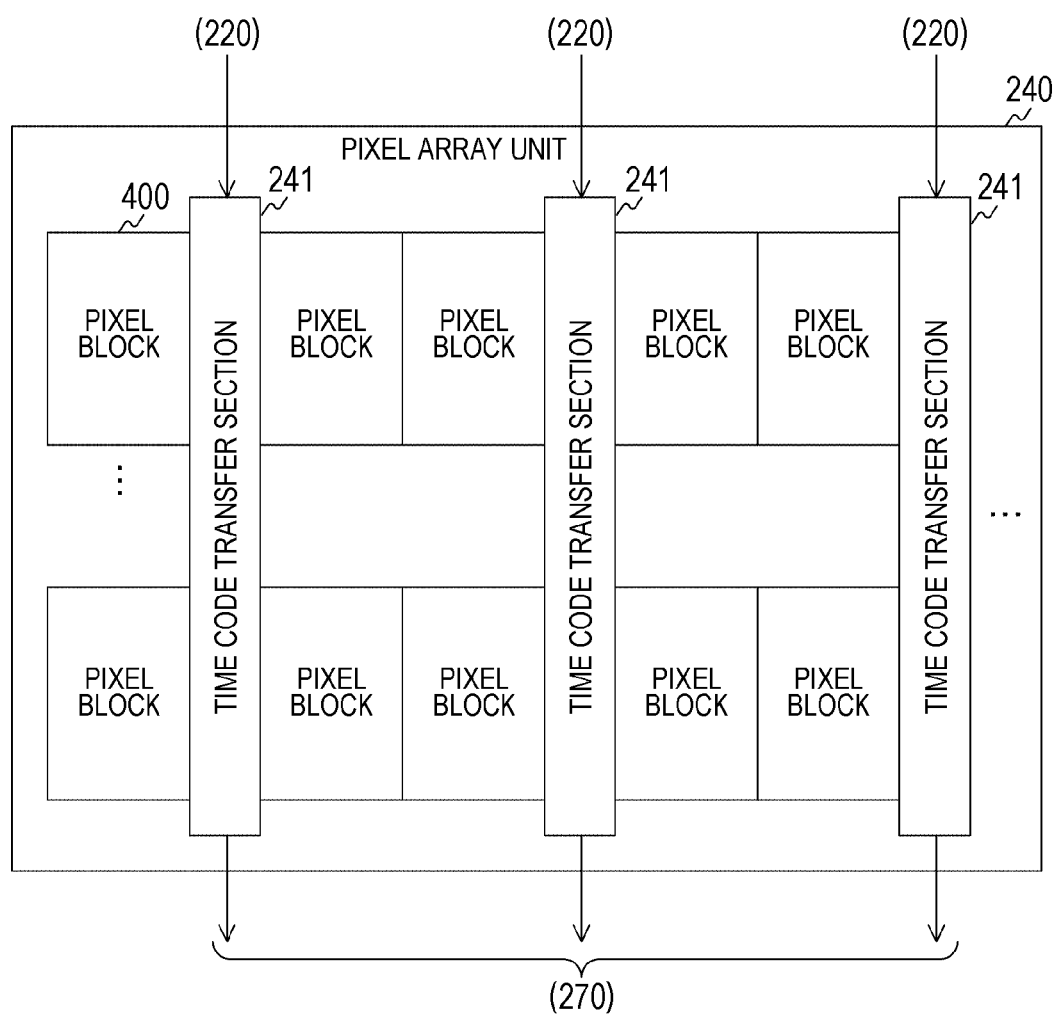
FIG. 21 is an example of a plan view of a pixel array unit of a second embodiment of the present technology.

FIG. 21 is an example of a plan view of a pixel array unit 240 of the second embodiment of the present technology. The pixel array unit 240 of the second embodiment is different from the first embodiment in that multiple pixel blocks 400 are arranged in a two-dimensional lattice shape.

Figure 22:
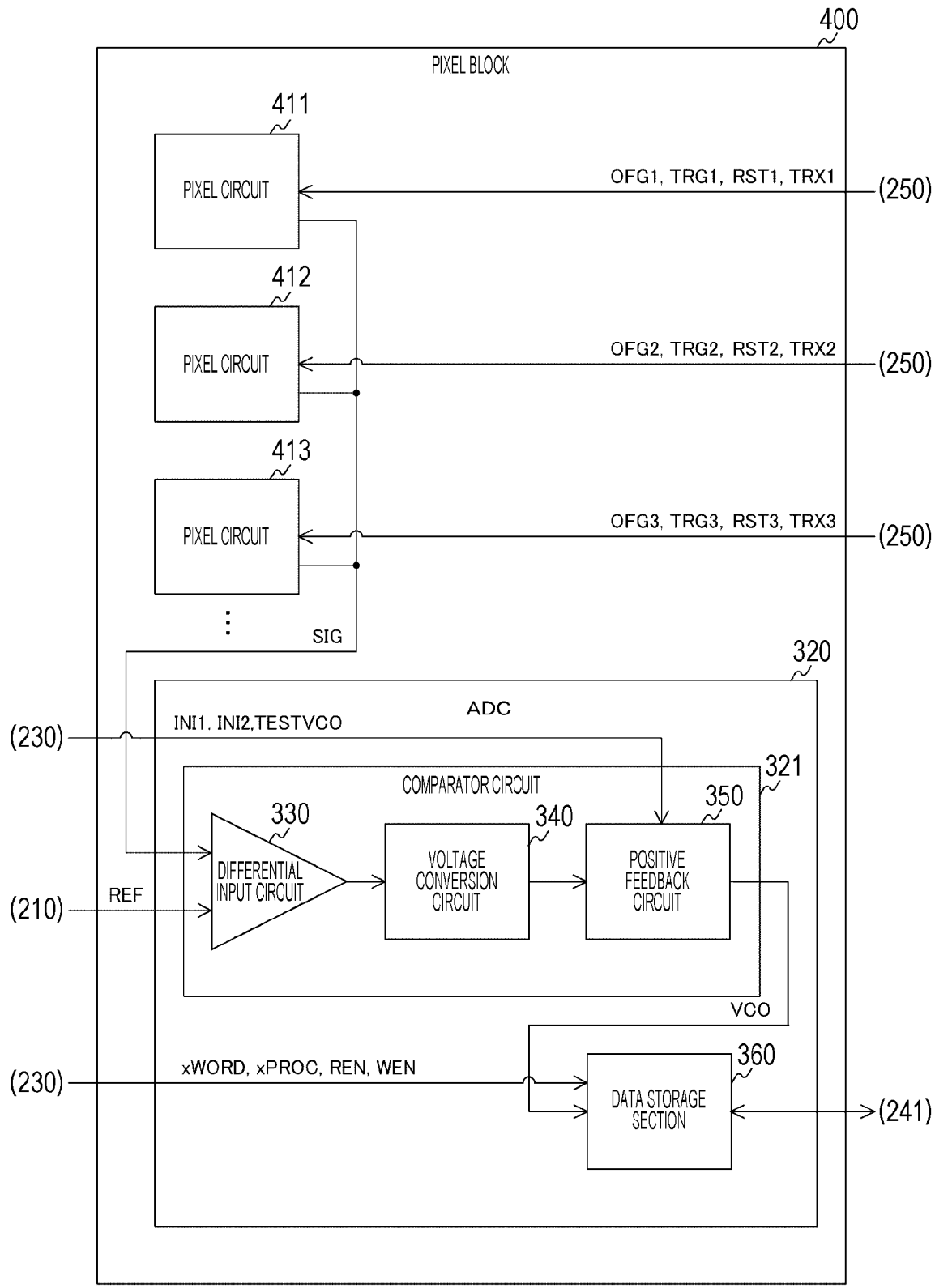
FIG. 22 is a block diagram showing a configuration example of a pixel block of the second embodiment of the present technology.

FIG. 22 is a block diagram showing a configuration example of the pixel block 400 of the second embodiment of the present technology. In the pixel block 400, multiple pixel circuits such as pixel circuits 411, 412, and 413 and one ADC 320 are arranged. For example, eight pixel circuits of two rows×four columns and four pixel circuits of two rows×two columns are arranged in the pixel block 400.

The circuit configurations of the pixel circuits 411, 412, and 413 are similar to that of the pixel circuit 310 of the first embodiment. The ADC 320 is shared by these pixel circuits.

The pixel driving circuit 250 supplies a drive signal OFGn (n is an integer), a transfer signal TRGn, a reset signal RSTn, and a transfer signal TRXn to the nth pixel circuit to drive the pixel circuit. Additionally, when a trigger signal XTRIG is input, the pixel driving circuit 250 selects and drives any one of the multiple pixel circuits for each pixel block 400. As a result, one piece of pixel data is read for each pixel block 400, and image data is generated. For this reason, the resolution of the image data of the second embodiment is lower than that of the first embodiment in which all pixels are read.

Figure 23:
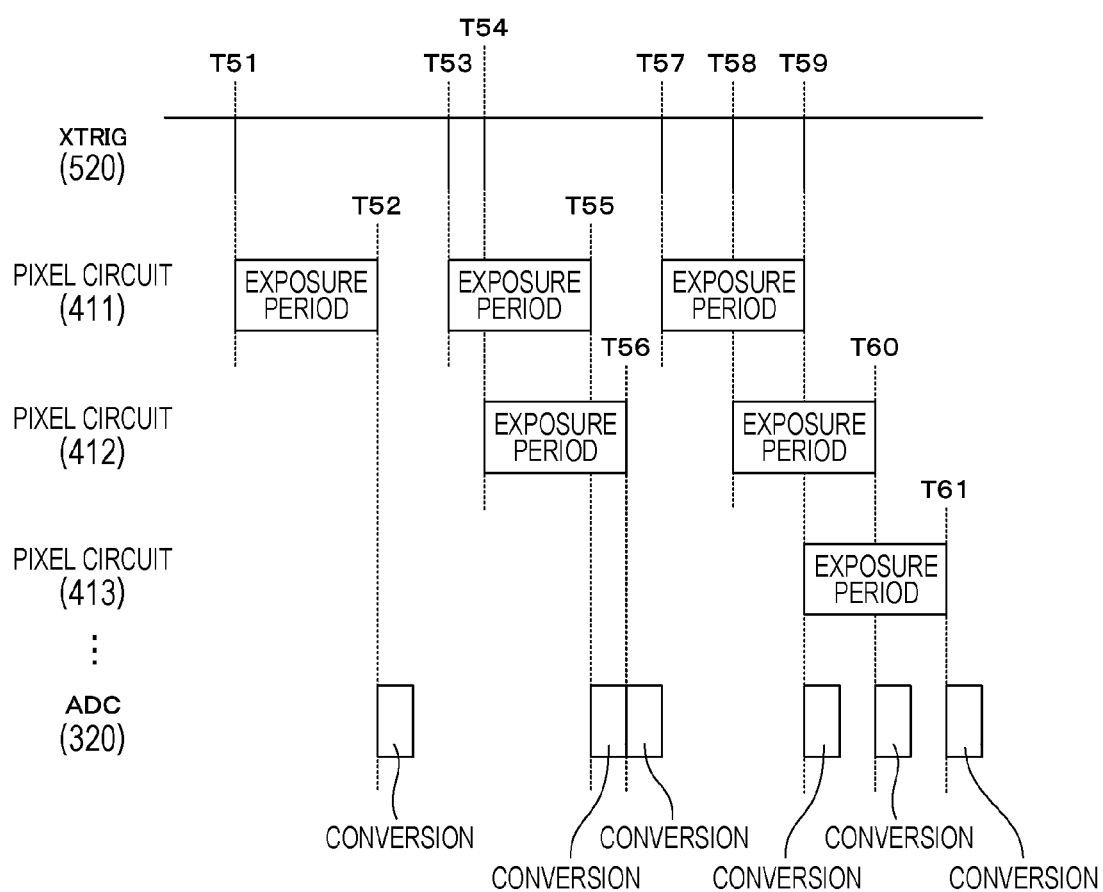
FIG. 23 is a timing chart showing an example of the operation of an imaging device of the second embodiment of the present technology.

FIG. 23 is a timing chart showing an example of the operation of an imaging device of the second embodiment of the present technology. In the first embodiment, when the trigger signal XTRIG is input during an exposure period, the next exposure cannot be started until the current exposure period ends. On the other hand, in the second embodiment, even if the trigger signal XTRIG is input during an exposure period, the solid-state image sensor 200 can start the next exposure.

For example, when the trigger signal XTRIG is input at timing T53, the pixel driving circuit 250 drives the pixel circuit 411 in the pixel block 400 to start exposure. Then, when the trigger signal XTRIG is input at timing T54 before the exposure period of the pixel circuit 411 ends, the pixel driving circuit 250 drives the pixel circuit 412 in the pixel block 400 to start exposure. Then, at timing T55 when the exposure period of the pixel circuit 411 ends, the ADC 320 starts AD conversion of the pixel signal corresponding to the pixel circuit 411. Then, at timing T56 when the exposure period of the pixel circuit 412 ends, the ADC 320 starts AD conversion of the pixel signal corresponding to the pixel circuit 412.

Additionally, when the trigger signal XTRIG is input at timing T57, the pixel driving circuit 250 drives the pixel circuit 411 in the pixel block 400 to start exposure. Then, when the trigger signal XTRIG is input oat timing T58 before the exposure period of the pixel circuit 411 ends, the pixel driving circuit 250 drives the pixel circuit 412 in the pixel block 400 to start exposure. Then, when the trigger signal XTRIG is input at timing T69 when the exposure period of the pixel circuit 411 ends, the pixel driving circuit 250 drives the pixel circuit 413 in the pixel block 400 to start exposure. Additionally, at timing T59 when the exposure period of the pixel circuit 411 ends, the ADC 320 starts AD conversion of the pixel signal corresponding to the pixel circuit 411. Then, at timing T60 when the exposure period of the pixel circuit 412 ends, the ADC 320 starts AD conversion of the pixel signal corresponding to the pixel circuit 412. Additionally, at timing T61 when the exposure period of the pixel circuit 413 ends, the ADC 320 starts AD conversion of the pixel signal corresponding to the pixel circuit 413.

As described above, even if the trigger signal XTRIG is input during the exposure of the pixel circuit 411, the solid-state image sensor 200 can drive the pixel circuit 412 or the pixel circuit 413 and start the next exposure. Note, however, that since AD conversion can only be performed for one pixel at a time, if the interval of the trigger signal XTRIG is shorter than the time required for AD conversion, the solid-state image sensor 200 cannot start exposure. In this case, the solid-state image sensor 200 only needs to start exposure after the elapse of the time required for AD conversion from the timing of the most recent trigger signal XTRIG, for example. Additionally, the solid-state image sensor 200 is similarly unable to start the next exposure when the trigger signal XTRIG is input during exposure of all the pixel circuits in the pixel block 400. In this case, the solid-state image sensor 200 only needs to start the next exposure when the exposure period of one of the pixel circuits ends, for example.

Note that the first, second, or third modification is applicable to the second embodiment as in the case of the first embodiment.

As described above, according to the second embodiment of the present technology, since multiple pixels share one ADC 320, the number of ADCs 320 per pixel can be reduced compared to the case where the ADC 320 is arranged for each pixel. As a result, the circuit scale and cost of the solid-state image sensor 200 can be reduced.

3. Third Embodiment

In the above-described first embodiment, one analog memory 314 is arranged for each pixel. However, with this configuration, when an exposure period shorter than the AD conversion period is set, if multiple trigger signals XTRIG are input within the AD conversion period, image data cannot be captured in response to each trigger signal. A solid-state image sensor 200 of a third embodiment is different from the first embodiment in that multiple analog memories are arranged for each pixel to capture multiple pieces of image data.

Figure 24:
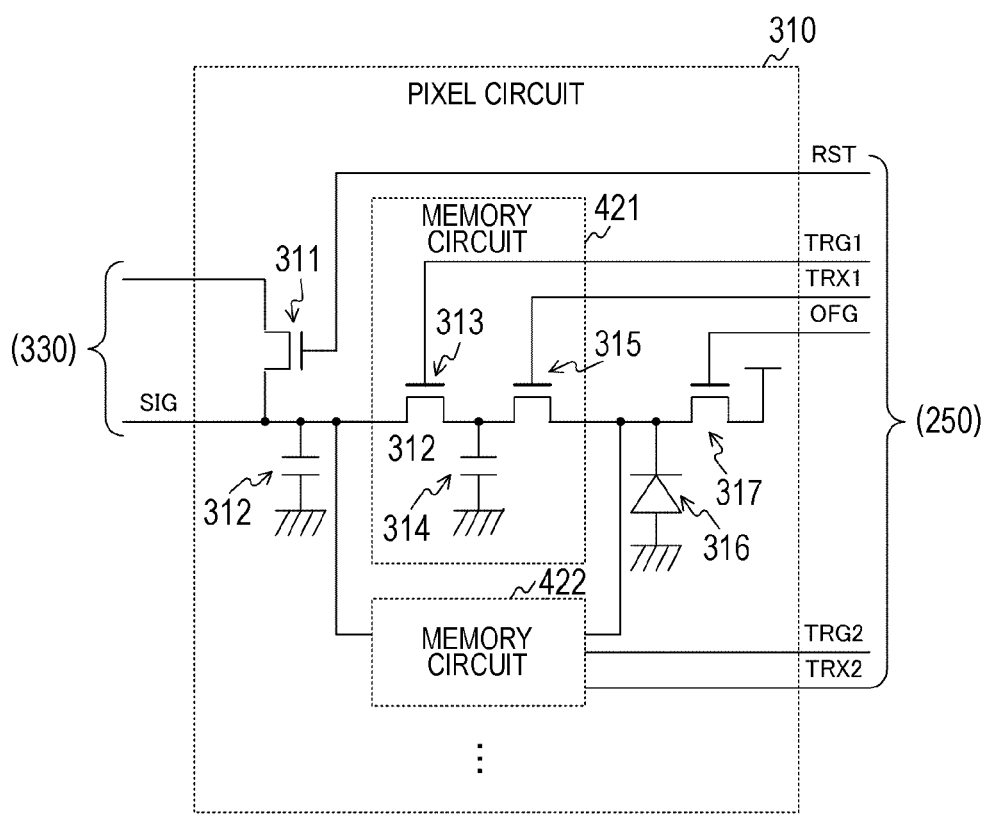
FIG. 24 is a circuit diagram showing a configuration example of a pixel circuit of a third embodiment of the present technology.

FIG. 24 is a circuit diagram showing a configuration example of a pixel circuit 310 of the third embodiment of the present technology. The pixel circuit 310 of the third embodiment includes a set transistor 311, a floating diffusion layer 312, multiple memory circuits such as memory circuits 421 and 422, a photodiode 316, and a discharge transistor 317. The multiple memory circuits are commonly connected to and share the floating diffusion layer 312 and the photodiode 316. Circuits at the subsequent stage of the pixel circuit 310 are similar to those of the first embodiment.

The memory circuit 421 includes transfer transistors 313 and 315 and an analog memory 314. The circuit configuration of the memory circuit 422 is similar to that of the memory circuit 421.

A pixel driving circuit 250 supplies a transfer signal TRGn and a transfer signal TRXn to the n-th memory circuit to transfer electric charges. Additionally, when a trigger signal XTRIG is input, the pixel driving circuit 250 selects, for each pixel circuit 310, any one of the multiple memory circuits, and transfers the electric charges. As a result, when an exposure period shorter than the AD conversion period is set, if multiple trigger signals XTRIG are input within the AD conversion period, the electric charges in the photodiode 316 can be sequentially transferred to the multiple memory circuits. Accordingly, it is possible to sequentially generate multiple pieces of image data having exposure periods shorter than the AD conversion period.

Note that the first, second, or third modification is applicable to the third embodiment as in the case of the first embodiment.

As described above, according to the third embodiment of the present technology, since the pixel driving circuit 250 sequentially transfers electric charges to the multiple memory circuits, multiple pieces of image data can be sequentially captured in exposure periods shorter than the AD conversion period.

<4. Example of Application to Movable Body>

The technology of the present disclosure (present technology) can be applied to various products. For example, the technology of the present disclosure may be implemented as a device mounted on any type of movable bodies including a car, an electric car, a hybrid electric car, a motorcycle, a bicycle, a personal mobility, an airplane, a drone, a ship, a robot, and the like.

Figure 25:
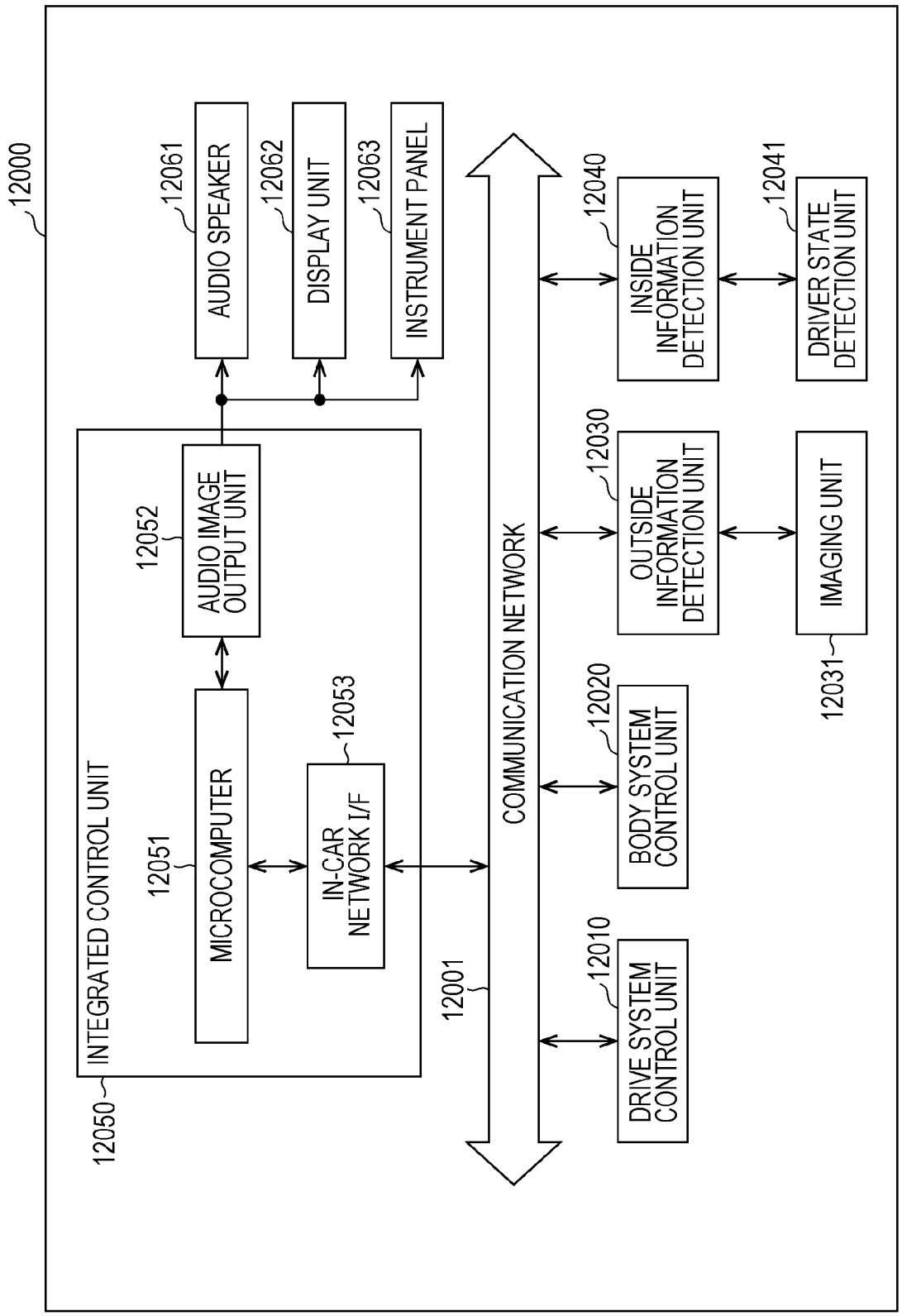
FIG. 25 is a block diagram showing a schematic configuration example of a vehicle control system.

FIG. 25 is a block diagram showing a schematic configuration example of a vehicle control system which is an example of a mobile control system to which the technology of the present disclosure can be applied.

A vehicle control system 12000 includes multiple electronic control units connected through a communication network 12001. In the example shown in FIG. 25, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an in-car network interface (I/F) 12053 are shown.

The drive system control unit 12010 controls the operation of devices related to the drive system of the vehicle according to various programs. For example, the drive system control unit 12010 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like.

The body system control unit 12020 controls the operation of various devices equipped on the vehicle body according to various programs. For example, the body system control unit 12020 functions as a controller of a keyless entry system, a smart key system, a power window device, or various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp, and the like of the vehicle.

The outside information detection unit 12030 detects information outside the vehicle equipped with the vehicle control system 12000. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal corresponding to the amount of light received. The imaging unit 12031 can output an electric signal as an image or can output the electrical signal as distance measurement information. Additionally, the light received by the imaging unit 12031 may be visible light or non-visible light such as infrared light.

The inside information detection unit 12040 detects information inside the vehicle. For example, a driver state detection unit 12041 that detects a state of a driver is connected to the inside information detection unit 12040. The driver state detection unit 12041 includes a camera for capturing an image of the driver, for example, and the inside information detection unit 12040 may calculate the degree of fatigue or concentration of the driver or determine whether or not the driver is asleep, on the basis of the detection information input from the driver state detection unit 12041.

The microcomputer 12051 can calculate a control target value of the drive force generation device, the steering mechanism, or the braking device on the basis of the information outside or inside the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information outside the vehicle acquired by the outside information detection unit 12030. For example, the microcomputer 12051 can control the headlamp according to the position of the preceding vehicle or oncoming vehicle detected by the outside information detection unit 12030, and perform coordinated control aimed for glare prevention such as switching from high beam to low beam.

The audio image output unit 12052 transmits an output signal of at least one of audio or an image to an output device capable of visually or aurally giving notification of information to a passenger or the outside of a vehicle. In the example of FIG. 25, an audio speaker 12061, a display unit 12062, and an instrument panel 12063 are shown as examples of the output device. The display unit 12062 may include at least one of an onboard display or a head-up display, for example.

Figure 26:
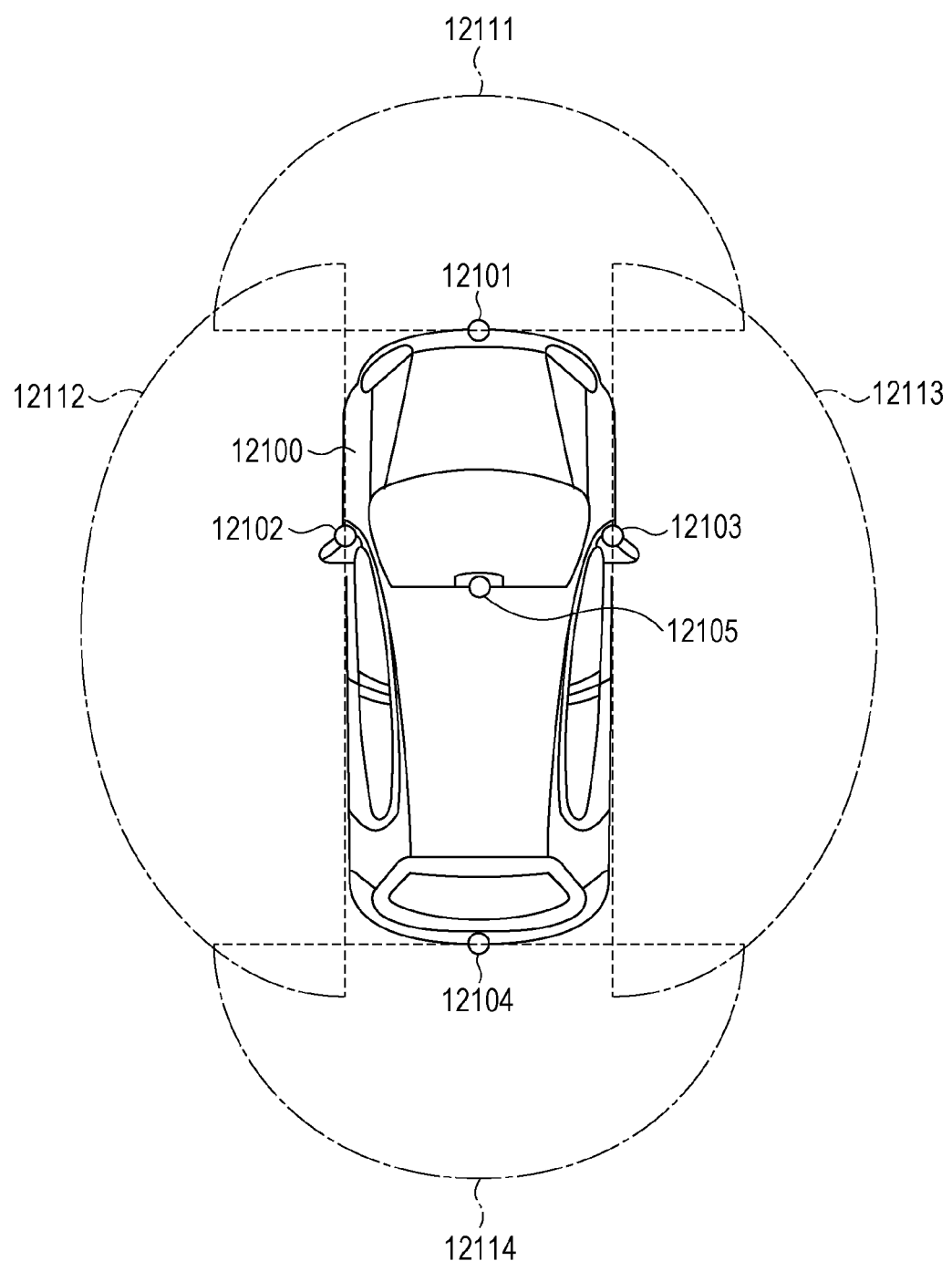
FIG. 26 is an explanatory diagram showing an example of an installation position of an imaging unit.

FIG. 26 is a diagram showing an example of the installation position of the imaging unit 12031.

In FIG. 26, imaging units 12101, 12102, 12103, 12104, and 12105 are included as the imaging unit 12031.

For example, the imaging units 12101, 12102, 12103, 12104, and 12105 are provided in positions such as a front nose, a side mirror, a rear bumper, a back door, and an upper portion of a windshield in the vehicle interior of the vehicle 12100. The imaging unit 12101 provided on the front nose and the imaging unit 12105 provided on the upper portion of the windshield in the vehicle interior mainly acquire images of the front of the vehicle 12100. The imaging units 12102 and 12103 provided on the side mirrors mainly acquire images of the sides of the vehicle 12100. The imaging unit 12104 provided on the rear bumper or the back door mainly acquires an image of the rear of the vehicle 12100. The imaging unit 12105 provided on the upper portion of the windshield in the vehicle interior is mainly used to detect a preceding vehicle or a pedestrian, an obstacle, a traffic light, a traffic sign, a lane, or the like.

Note that FIG. 26 shows an example of the imaging ranges of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided on the rear bumper or the back door. For example, by superimposing the pieces of image data captured by the imaging units 12101 to 12104, a bird's eye view image of the vehicle 12100 as viewed from above can be obtained.

At least one of the imaging units 12101 to 12104 may have a function of acquiring distance information. For example, at least one of the imaging units 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging units 12101 to 12104, to extract, as a preceding vehicle, the closest three-dimensional object on the traveling path of the vehicle 12100 in particular, the three-dimensional object traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging units 12101 to 12104, the microcomputer 12051 can extract three-dimensional object data regarding three-dimensional objects by classifying the data into a two-wheeled vehicle, an ordinary vehicle, a large vehicle, a pedestrian, and other three-dimensional objects such as a telephone pole, and use the data for automatic avoidance of obstacles. For example, the microcomputer 12051 identifies obstacles around the vehicle 12100 as obstacles visible or hardly visible to the driver of the vehicle 12100. Then, the microcomputer 12051 can determine the collision risk indicating the degree of risk of collision with each obstacle, and when the collision risk is a setting value or more and there is a possibility of a collision, the microcomputer 12051 can perform driving support for collision avoidance by outputting a warning to the driver through the audio speaker 12061 or the display unit 12062, or by performing forcible deceleration or avoidance steering through the drive system control unit 12010.

At least one of the imaging units 12101 to 12104 may be an infrared camera that detects infrared light.

For example, the microcomputer 12051 can recognize a pedestrian by determining whether or not a pedestrian is present in the images captured by the imaging units 12101 to 12104. Such pedestrian recognition is performed by a procedure of extracting feature points in images captured by the imaging units 12101 to 12104 as infrared cameras, and a procedure of performing pattern matching processing on a series of feature points indicating the outline of an object to determine whether or not the object is a pedestrian, for example. When the microcomputer 12051 determines that a pedestrian is present in the images captured by the imaging units 12101 to 12104 and recognizes the pedestrian, the audio image output unit 12052 controls the display unit 12062, so that a square outline for emphasis is superimposed on the recognized pedestrian. Additionally, the audio image output unit 12052 may control the display unit 12062, so that an icon or the like indicating a pedestrian is displayed in a desired position.

Hereinabove, an example of the vehicle control system to which the technology of the present disclosure can be applied has been described. Of the above-described configuration, the technology according to the present disclosure is applicable to the imaging unit 12031, for example. Specifically, the imaging device 100 of FIG. 1 can be applied to the imaging unit 12031, for example. By applying the technology according to the present disclosure to the imaging unit 12031, the dead period can be shortened, and thus the convenience and reliability of the system can be improved.

Note that the above-described embodiments are an example for embodying the present technology, and the matters in the embodiments and the matters specifying the invention in the claims have a corresponding relationship. Similarly, the matters specifying the invention in the claims and the matters having the same names in the embodiments of the present technology have a correspondence relationship. Note, however, that the present technology is not limited to the embodiments, and can be embodied by variously modifying the embodiments without departing from the gist of the present technology.

Note that the present technology can also be configured in the following manner.

(1) A solid-state image sensor including:

a photodiode that generates electric charges by photoelectric conversion;

an electric charge accumulation unit that accumulates the electric charges;

a floating diffusion layer that converts the electric charges into a signal level corresponding to the amount of the electric charges;

an exposure end transfer transistor that transfers the electric charges from the photodiode to the electric charge accumulation unit when a predetermined exposure period ends;

a reset transistor that initializes a voltage of the floating diffusion layer to a predetermined reset level when the exposure period ends;

a discharge transistor that, when a new exposure period is started after the electric charges are transferred to the electric charge accumulation unit, discharges electric charges newly generated in the photodiode; and a conversion end transfer transistor that, when processing of converting a predetermined reset level into a digital signal ends, transfers the electric charges from the electric charge accumulation unit to the floating diffusion layer.

(2) The solid-state image sensor according to (1) above, further including an analog-to-digital converter that sequentially performs reset level conversion processing of converting the reset level into the digital signal, and signal level conversion processing of sequentially converting the signal level into a digital signal.

(3) The solid-state image sensor according to (2) above, in which the photodiode, the electric charge accumulation unit, the floating diffusion layer, the exposure end transfer transistor, the discharge reset transistor, the conversion end transfer transistor, and the reset transistor are arranged on a predetermined light receiving board, and at least a part of the analog-to-digital converter is arranged on a predetermined circuit board stacked on the predetermined light receiving board.

(4) The solid-state image sensor according to any one of (1) to (3) above, further including:

a source follower transistor that has a gate connected to the floating diffusion layer and a drain connected to a power supply terminal;

a selection transistor that outputs a signal from a source of the source follower transistor to the analog-to-digital converter according to a predetermined selection signal; and a cascode transistor that is cascode-connected to the selection transistor.

(5) The solid-state image sensor according to any one of (1) to (4) above, in which the photodiode, the electric charge accumulation unit, the floating diffusion layer, the exposure end transfer transistor, the photodiode reset transistor, the conversion end transfer transistor, and the floating diffusion layer reset transistor are arranged in each of multiple pixels.

(6) The solid-state image sensor according to (5) above, in which the electric charge accumulation unit, the exposure end transfer transistor, and the conversion end transfer transistor are arranged in each of multiple memory circuits sharing the photodiode and the floating diffusion layer.

(7) The solid-state image sensor according to (5) above, in which the analog-to-digital converter is arranged in each of the multiple pixels.

(8) The solid-state image sensor according to (5) above, in which the analog-to-digital converter is arranged in each of multiple pixel blocks each including a predetermined number of pixels.

(9) The solid-state image sensor according to any one of (1) to (8) above, in which the analog-to-digital converter repeats the reset level conversion processing from the beginning in a case where the amount of the electric charges in the photodiode is initialized during the reset level conversion processing.

(10) The solid-state image sensor according to any one of (1) to (9) above, in which the analog-to-digital converter repeats the signal level conversion processing from the beginning in a case where the amount of the electric charges in the photodiode is initialized during the signal level conversion processing.

(11) The solid-state image sensor according to any one of (1) to (10) above, further including a signal processing unit that performs correlated double sampling processing for obtaining, as image data, a difference between the digital signal obtained by converting the reset level and the digital signal obtained by converting the signal level.

(12) The solid-state image sensor according to (11) above, in which the signal processing unit further performs dark current correction for removing dark current from the image data.

(13) An imaging device including:

a photodiode that generates electric charges by photoelectric conversion;

an electric charge accumulation unit that accumulates the electric charges;

a floating diffusion layer that converts the electric charges into a signal level corresponding to the amount of the electric charges;

an exposure end transfer transistor that transfers the electric charges from the photodiode to the electric charge accumulation unit when a predetermined exposure period ends;

a reset transistor that initializes a voltage of the floating diffusion layer to a predetermined reset level when the exposure period ends;

a discharge transistor that, when a new exposure period is started after the electric charges are transferred to the electric charge accumulation unit, discharges electric charges newly generated in the photodiode;

a conversion end transfer transistor that, when processing of converting a predetermined reset level into a digital signal ends, transfers the electric charges from the electric charge accumulation unit to the floating diffusion layer; and a signal processing unit that processes the digital signal obtained by converting the reset level and a digital signal obtained by converting the signal level.

(14) A method of controlling a solid-state image sensor, including:

an exposure end transfer procedure of transferring electric charges from a photodiode that generates electric charges by photoelectric conversion when a predetermined exposure period ends to an electric charge accumulation unit that accumulates the electric charges;

a reset procedure of initializing a voltage of the floating diffusion layer to a predetermined reset level when the exposure period ends;

a discharge procedure of, when a new exposure period is started after the electric charges are transferred to the electric charge accumulation unit, discharging electric charges newly generated in the photodiode; and a conversion end transfer procedure of, when processing of converting a predetermined reset level into a digital signal ends, transferring the electric charges from the electric charge accumulation unit to the floating diffusion layer that converts the electric charges into a signal level corresponding to the amount of the electric charges.

REFERENCE SIGNS LIST

100 Imaging device
110 Optical unit

120 DSP circuit
130 Display unit
140 Operation unit
150 Bus
160 Frame memory
170 Storage unit
180 Power supply unit
200 Solid-state image sensor
201 Light receiving chip
202 Circuit chip
210 DAC
220 Time code generation unit
230 Vertical driving circuit
240 Pixel array unit
241 Time code transfer section
250 Pixel driving circuit
260 Timing generation circuit
270 Signal processing unit
300 Pixel
301 Light-shielded pixel
302 Effective pixel
310, 411, 412, 413 Pixel circuit
311 Reset transistor
312 Floating diffusion layer
313, 315 Transfer transistor
314 Analog memory
316 Photodiode
317 Discharge transistor
320 ADC
321 Comparator circuit
330 Differential input circuit
331, 334, 336, 351, 352, 355, 356 PMOS transistor
332, 333, 335, 341, 353, 354, 357 NMOS transistor
340 Voltage conversion circuit
350 Positive feedback circuit
360 Data storage section
371 Source follower transistor
372 Selection transistor
373 Cascode transistor
400 Pixel block
421, 422 Memory circuit
510 Belt conveyor
511 Product
520 Detection sensor

The invention claimed is:

1. A solid-state image sensor comprising:
a photodiode that generates electric charges by photoelectric conversion;
a capacitor that accumulates the electric charges;
a floating diffusion layer that converts the electric charges into a signal level corresponding to the amount of the electric charges;
an exposure end transfer transistor that transfers the electric charges from the photodiode to the capacitor when a predetermined exposure period ends;
a reset transistor that initializes a voltage of the floating diffusion layer to a predetermined reset level when the exposure period ends;
a discharge transistor that, when a new exposure period is started after the electric charges are transferred to the capacitor, discharges electric charges newly generated in the photodiode; and
a conversion end transfer transistor that, when processing of converting the predetermined reset level into a digital signal ends, transfers the electric charges from the capacitor to the floating diffusion layer.

2. The solid-state image sensor according to claim 1, further comprising
an analog-to-digital converter that sequentially performs reset level conversion processing of converting the reset level into the digital signal, and signal level conversion processing of sequentially converting the signal level into a digital signal.

3. The solid-state image sensor according to claim 2 wherein
the photodiode, the capacitor, the floating diffusion layer, the exposure end transfer transistor, the discharge transistor, the conversion end transfer transistor, and the reset transistor are arranged on a predetermined light receiving board, and
at least a part of the analog-to-digital converter is arranged on a predetermined circuit board stacked on the predetermined light receiving board.

4. The solid-state image sensor according to claim 1, further comprising:
a source follower transistor that has a gate connected to the floating diffusion layer and a drain connected to a power supply terminal;
a selection transistor that outputs a signal from a source of the source follower transistor to the analog-to-digital converter according to a predetermined selection signal; and
a cascode transistor that is cascode-connected to the selection transistor.

5. The solid-state image sensor according to claim 1, wherein the photodiode, the capacitor, the floating diffusion layer, the exposure end transfer transistor, the photodiode reset transistor, the conversion end transfer transistor, and the floating diffusion layer reset transistor are arranged in each of a plurality of pixels.

6. The solid-state image sensor according to claim 5, wherein the capacitor, the exposure end transfer transistor, and the conversion end transfer transistor are arranged in each of a plurality of memory circuits sharing the photodiode and the floating diffusion layer.

7. The solid-state image sensor according to claim 5, wherein the analog-to-digital converter is arranged in each of the plurality of pixels.

8. The solid-state image sensor according to claim 5, wherein the analog-to-digital converter is arranged in each of a plurality of pixel blocks each including a predetermined number of pixels.

9. The solid-state image sensor according to claim 1, wherein
the analog-to-digital converter repeats the reset level conversion processing from the beginning in a case where the amount of the electric charges in the photodiode is initialized during the reset level conversion processing.

10. The solid-state image sensor according to claim 1, wherein
the analog-to-digital converter repeats the signal level conversion processing from the beginning in a case where the amount of the electric charges in the photodiode is initialized during the signal level conversion processing.

11. The solid-state image sensor according to claim 1, further comprising
a signal processor configured to performs correlated double sampling processing for obtaining, as image data, a difference between the digital signal obtained by converting the reset level and the digital signal obtained by converting the signal level.

12. The solid-state image sensor according to claim 11, wherein the signal processor further performs dark current correction for removing dark current from the image data.

13. An imaging device comprising:
- a photodiode that generates electric charges by photoelectric conversion;
- a capacitor that accumulates the electric charges;
- a floating diffusion layer that converts the electric charges into a signal level corresponding to the amount of the electric charges;
- an exposure end transfer transistor that transfers the electric charges from the photodiode to the capacitor when a predetermined exposure period ends;
- a reset transistor that initializes a voltage of the floating diffusion layer to a predetermined reset level when the exposure period ends;
- a discharge transistor that, when a new exposure period is started after the electric charges are transferred to the capacitor, discharges electric charges newly generated in the photodiode;
- a conversion end transfer transistor that, when processing of converting a predetermined reset level into a digital signal ends, transfers the electric charges from the capacitor to the floating diffusion layer; and
- a signal processor configured to processes the digital signal obtained by converting the reset level and a digital signal obtained by converting the signal level.

14. The imaging device according to claim 13, further comprising
- an analog-to-digital converter that sequentially performs reset level conversion processing of converting the reset level into the digital signal, and signal level conversion processing of sequentially converting the signal level into a digital signal.

15. The imaging device according to claim 14 wherein
- the photodiode, the capacitor, the floating diffusion layer, the exposure end transfer transistor, the discharge transistor, the conversion end transfer transistor, and the reset transistor are arranged on a predetermined light receiving board, and
- at least a part of the analog-to-digital converter is arranged on a predetermined circuit board stacked on the predetermined light receiving board.

16. The imaging device according to claim 13, further comprising:
- a source follower transistor that has a gate connected to the floating diffusion layer and a drain connected to a power supply terminal;
- a selection transistor that outputs a signal from a source of the source follower transistor to the analog-to-digital converter according to a predetermined selection signal; and
- a cascode transistor that is cascode-connected to the selection transistor.

17. The imaging device according to claim 13, wherein
- the photodiode, the capacitor, the floating diffusion layer, the exposure end transfer transistor, the photodiode reset transistor, the conversion end transfer transistor, and the floating diffusion layer reset transistor are arranged in each of a plurality of pixels.

18. The imaging device according to claim 13, wherein
- the analog-to-digital converter repeats the reset level conversion processing from the beginning in a case where the amount of the electric charges in the photodiode is initialized during the reset level conversion processing.

19. The imaging device according to claim 13, wherein
- the analog-to-digital converter repeats the signal level conversion processing from the beginning in a case where the amount of the electric charges in the photodiode is initialized during the signal level conversion processing.

20. A method of controlling a solid-state image sensor, comprising:
- an exposure end transfer procedure of transferring electric charges from a photodiode that generates electric charges by photoelectric conversion when a predetermined exposure period ends to a capacitor that accumulates the electric charges;
- a reset procedure of initializing a voltage of the floating diffusion layer to a predetermined reset level when the exposure period ends;
- a discharge procedure of, when a new exposure period is started after the electric charges are transferred to the capacitor, discharging electric charges newly generated in the photodiode; and
- a conversion end transfer procedure of, when processing of converting a predetermined reset level into a digital signal ends, transferring the electric charges from the capacitor to the floating diffusion layer that converts the electric charges into a signal level corresponding to the amount of the electric charges.

* * * * *